US011455477B2

(12) United States Patent
Blank et al.

(10) Patent No.: US 11,455,477 B2
(45) Date of Patent: Sep. 27, 2022

(54) MOBILE RFID ASSET TRACKER

(71) Applicant: Engineered Products of Ohio, LLC, Cortland, OH (US)

(72) Inventors: Brian Blank, Cortland, OH (US); Christopher Scott Williams, San Diego, CA (US)

(73) Assignee: ENGINEERED PRODUCTS OF OHIO, LLC, Cortland, OH (US)

( * ) Notice: Subject to any disclaimer, the term of this patent is extended or adjusted under 35 U.S.C. 154(b) by 0 days.

(21) Appl. No.: 17/308,536

(22) Filed: May 5, 2021

(65) Prior Publication Data
US 2021/0350091 A1 Nov. 11, 2021

Related U.S. Application Data

(60) Provisional application No. 63/021,248, filed on May 7, 2020.

(51) Int. Cl.
G06K 7/10 (2006.01)
G06K 7/00 (2006.01)
G06K 7/14 (2006.01)

(52) U.S. Cl.
CPC ....... G06K 7/0004 (2013.01); G06K 7/10316 (2013.01); G06K 7/10415 (2013.01); G06K 7/1413 (2013.01)

(58) Field of Classification Search
CPC ............. G06K 7/0004; G06K 7/10316; G06K 7/10415; G06K 7/1413
See application file for complete search history.

(56) References Cited

U.S. PATENT DOCUMENTS

| 8,041,369 | B2 | 10/2011 | Smith et al. | |
| 8,120,467 | B2 | 2/2012 | Ehrman et al. | |
| 10,572,702 | B2 | 2/2020 | Grimaux | |
| 2007/0052521 | A1* | 3/2007 | Beedles | H01Q 1/2216 340/572.1 |

* cited by examiner

Primary Examiner — Jamara A Franklin
(74) Attorney, Agent, or Firm — Sand, Sebolt & Wernow Co., LPA

(57) ABSTRACT

A self-contained, mobile Radio Frequency Identification (RFID) asset tracker and hardware assembly and method of use thereof. The mobile RFID asset tracker includes a frame mounted on locking swivel casters which provide a mobile base for mounting of an RFID antenna, RFID reader and other electrical equipment thereon. An electronics control box, which is adjustably mounted on the frame, houses the RFID reader, a custom Printed Circuit Board (PCB) control module, cellular and WIFI modems, and a power source. The electronics control box is operatively engaged via Input/Output (IO) ports and cabling to an external indicator assembly and to the external adjustably mounted RFID antenna.

26 Claims, 10 Drawing Sheets

MOBILE RFID ASSET TRACKER

CROSS REFERENCE TO RELATED APPLICATIONS

This application claims the benefit of U.S. Provisional Application Ser. No. 63/021,248 filed on May 7, 2020, the disclosure of which is incorporated herein by reference.

BACKGROUND

Technical Field

This disclosure is directed to an entire plug and play Radio Frequency Identification (RFID) system to identify and track equipment and assets in many different environments that traditionally require extensive scientific and technical expertise, more specifically with radio frequency identification, RFID devices and deployment of RFID systems and the effects of physics on radio waves. In particular, the present disclosure is directed to a self-contained mobile RFID tracker that is movable by a single human operator from one location to another and is configured to be ready for use without requiring technical expertise or an extensive setup procedure.

Background Information

RFID systems typically include an RFID reader that is capable of reading RFID tags that are provided on products. RFID systems well known within the art typically require that many different components be selected, tested, and integrated with each other to produce a working system for an asset to be tracked. The term "asset" will be used herein to denote a product, piece of equipment, packaging, person, or any other item that has been provided with an RFID tag. A high level of scientific, technical, mechanical, and electrical expertise is normally required to achieve a successful working RFID system. In addition, it has traditionally been imperative that this expertise be physically on site at the installation of the system into a facility.

Because of the level of expertise required in installing such RFID systems, in most settings RFID systems are permanent installations. This arrangement requires that, in a production facility, for example, the products be taken through the permanent RFID system installation in order to read the RFID tags on those tagged assets. In some instances, this requires that the products be removed from a production line or be specially diverted to a different part of the facility in order for the RFID tags to be read, adding to the time and cost of using RFID tags on the products.

Several solutions have been offered in the prior art to address this situation. Smith et al. (U.S. Pat. No. 8,041,269) discloses a plug-in network appliance that converts power received from a plug-in in a first format to power in a second format for powering various components. Smith discloses that passive RFID systems are only able to detect the presence of an article or item that is within range of an RFID portal or interrogator. A query signal is sent out by the RFID interrogator or portal and any RFID tag that is located within the interrogator or portal's range will responds. Smith further states that RFID systems, whether active or passive, will typically require that a dedicated infrastructure of portals or interrogators for tracking be installed and that this infrastructure may be difficult and/or expensive to deploy. Additionally, such infrastructure typically lacks flexibility. The plug-in network applicant disclosed by Smith is provided to address the downside of permanent RFID system installations. Smith's system includes a mesh network that is useful for tracking objects within an indoor facility. The mesh network includes a plurality of network appliances that are in wireless communication with one another. Each of the network appliances is located in a different but fixed location within the facility. Each network appliance includes an RFID transceiver and has a power connection to an electrical outlet. A signal from an RFID tagged object is received by more than one of the network appliances and the difference in time of flight of the signal between the various network appliances is used to determine the location of the tagged object within the facility. While this system negates the need for transporting tagged objects to a specific location within a facility in order to be read by an RFID interrogator or portal, the system is still complex and requires expertise to set up and run.

Ehrman et al. (U.S. Pat. No. 8,120,467—hereafter "Ehrman") discloses a mobile RFID portal that must be attached to a mobile vehicle such as a forklift or truck. The vehicle is used to transport RFID tagged items from one location within a facility to another. The RFID portal draws power from the vehicle itself and includes a controller with software that activates an RFID reader on the portal when certain vehicle events occur. For example, the RFID reader may be activated when the forklift lifts an RFID tagged item and/or when the forklift again places the RFID tagged item back on the ground. The RFID reader interrogates the RFID tag on the item and temporarily stores data from the interrogated RFID tag in a data storage unit that is provided as part of the RFID portal. When the vehicle approaches a gateway to a remote central processing unit, the stored date is communicated from the portal's data storage unit to the central processing unit via a communication device provided on the portal. Ehrman's system is designed so that the vehicle carrying RFID tagged items from one location to another in a facility simultaneously will interrogate the RFID tags, thereby avoiding the need for the vehicle to pass through a fixed RFID portal provided at the facility. Ehrman's system removes the need for RFID tagged items to be specially transported to a fixed location in a facility for reading by an RFID interrogator, however, the RFID tagged items need to be carried by the mobile vehicle itself in order to be interrogated.

Grimaux (U.S. Pat. No. 10,572,702) discloses an RFID portal for a temporary event utilizing an RFID reader to read tagged assets moving through a static but temporary read zone. People attending the temporary event are provided with a wristband or anklet including an RFID tag encoded with relevant information to permit entry of the wearer into the event. The RFID portal includes a housing in which the RFID reader is contained. Specifically, the RFID reader is located proximate a side wall of the housing at a height suitable for reading either wristbands or anklets. The RFID reader is operatively linked to a server that includes a list of valid user IDs, i.e., user identification information, pertaining to the event. When a person walks normally through the temporary read zone, the RFID reader reads their RFID tag and displays on two opposed screens on an upper region of the housing whether entry into the event is permitted or not. One of the screens faces security personnel and the other screen faces the person entering the event. The portal may include a light and/or an emitter for generating sounds that help to indicate to security personnel whether entry for that particular person is permitted or not. Grimaux's RFID portal can be moved to a location where it is desired to interrogate RFID tags, however, the portal itself is somewhat limited in that it requires the RFID tags to be presented to it in a specific manner or the interrogation cannot take place successfully.

SUMMARY

The present disclosure relates to a self-contained, mobile, Radio Frequency Identification (RFID) asset tracker which provides a customer-installed and configurable RFID mobile solution that does not require the expertise and physical presence of expert installers to achieve success. The RFID asset tracker disclosed herein is able to be easily moved between different locations in a facility and is easily adjusted to accommodate conditions at the various locations. Furthermore, the disclosed RFID asset tracker does not require any expertise to set up for use. The tracker simply needs to be provided with power and once booted up can be used immediately by personnel who do not possess expertise in RFID setup and installation. As indicated above, accepted practice in the RFID scientific and engineering communities frequently requires expertise in physics, engineering, software development, and/or systems integration to successfully install a functional RFID system. In addition, "on-site" testing is typically required to configure and set parameters and hardware required for a successful RFID system install. The present disclosure is directed to an apparatus for self-setup and self-monitoring.

The RFID mobile asset tracker stand and hardware assembly disclosed herein includes an adjustable frame mounted on lockable swivel casters which provide a mobile platform for an RFID reader and other electrical equipment to be mounted. An electronics control box mounted on the mobile frame houses an RFID reader, a custom Printed Circuit Board (PCB) control module, a communications device in the form of a cellular and WIFI modem, and a power source. The electronics control box also includes Input/Output (I/O) ports and cabling extending to an indicator assembly and a passive Ultra High Frequency (UHF) RFID antenna. The indicator assembly and RFID antenna are mounted on the frame external to the electronics control box.

In one aspect, an exemplary embodiment of the present disclosure may provide a self-contained mobile Radio Frequency Identification (RFID) asset tracker comprising a frame configured for movement across a surface; an electronics control box mounted on the frame; an RFID reader housed within the electronics control box, said RFID reader being adapted to interrogate an RFID tag on an item; and an RFID antenna mounted on the frame outside of the electronics control box, said RFID antenna being coupled with the RFID reader; wherein said RFID reader is configured to interrogate RFID tagged items that come into a field of view of the RFID antenna.

In one embodiment, the asset tracker may further comprise a power source housed within the electronics control box, said power source being operatively engaged with the RFID reader and the RFID antenna. In one embodiment, the asset tracker may further comprise a communications device housed within the electronics control box, said communications device being coupled with the RFID reader and being adapted to communicate with a remote central processing unit. In one embodiment, the asset tracker may further comprise a power source operatively engaged with the RFID reader, the RFID antenna, and the communications device, wherein the power source is housed within the electronics control box. In one embodiment, the asset tracker may further comprise a Printed Circuit Board (PCB) control module housed within the electronics control box and operatively engaged with the RFID reader and with the RFID antenna, wherein programming is provided in the PCB control module and is configured to control operation of the RFID reader and the RFID antenna. In one embodiment, the PCB control module may include a memory for data storage, and wherein interrogated data retrieved by the RFID reader is at least temporarily stored in the memory. In one embodiment, the asset tracker may further comprise a power source housed within the electronics control box, wherein the power source is operatively engaged with the RFID reader, the RFID antenna, and the PCB control module.

In one embodiment, the asset tracker may further comprise an indicator assembly coupled with the RFID reader and the PCB control module, said indicator assembly being configured to provide one or both of a visual indicator and an audible indicator to an operator when the RFID reader interrogates an RFID-tagged item. In one embodiment, the indicator assembly may be engaged with the frame outside of the electronics control box. In one embodiment, the indicator assembly may comprise a light stack having one or more lights provided therein. In one embodiment, the one or more lights of the light stack may comprise at least two lights of different colors. In one embodiment, the indicator assembly may comprise a display screen.

In one embodiment, the asset tracker may further comprise a barcode scanner operatively engaged with the frame and located outside of the electronics control box, wherein the barcode scanner is coupled with the PCB control module. In one embodiment, the asset tracker may further comprise a mounting assembly which operatively engages the RFID antenna to the frame a distance from the electronics control box; wherein the mounting assembly is configured to permit the RFID antenna to be oriented at a range of different angles relative to the frame. In one embodiment, the mounting assembly may include at least one ball and socket joint that enables pivotal motion of the RFID antenna about a center point. In one embodiment, the asset tracker may further comprise an RFID writer that is provided as an integral part of the RFID reader or is separate from the RFID reader and is housed within the electronics control box. In one embodiment, the asset tracker may further comprise a plurality of casters provided on the frame, said plurality of casters enabling rolling movement of the frame across the surface. In one embodiment, the asset tracker may be sufficiently light in weight as to be rolled across a floor surface by a single human operator pushing or pulling the frame. In one embodiment, a position of the electronics control box and the RFID antenna on the vertical strut may be selectively adjustable.

In another aspect, an exemplary embodiment of the present disclosure may provide a self-contained mobile asset tracker comprising a frame configured for rolling movement across a surface; an electronics control box mounted on the frame; an RFID reader writer housed with the electronics control box; an RFID antenna mounted on the frame a distance apart from the electronics control box; said RFID antenna being coupled with the RFID reader writer; a PCB control module housed within the electronics control box, wherein said PBC control module is coupled with the RFID antenna and the RFID reader writer; wherein under control of programming provided in the PCB control module, said RFID reader writer is adapted to interrogate an RFID tag on an item that comes into a field of view of the RFID antenna and/or to write data on the RFID tag.

In one embodiment, the self-contained mobile asset tracker may further comprise a barcode scanner mounted on the frame outside of the electronic control box, said barcode scanner being coupled with the PCB control module and being adapted to scan barcode IDs that come into a range of the barcode scanner. In one embodiment, the self-contained mobile asset tracker may further comprise a communications module housed within the electronics control box, wherein the communications module is coupled with the PCB control module, wherein the communications module is adapted to communicate with electronic devices remote from the self-contained mobile asset tracker. In one embodiment, the self-contained mobile asset tracker may further comprise an indicator assembly mounted on the frame and coupled with the PBC control module, wherein the indicator assembly is configured to provide one or both of a visual indicator and an audible indicator to an operator.

In another aspect, and exemplary embodiment of the present disclosure may provide a system comprising a device for holding, carrying or transporting RFID tagged articles; a mobile RFID asset tracker that is selectively independently movable into proximity of the device; said mobile RFID asset tracker comprising a frame that is movable across a surface; an electronic control box mounted on the frame; an RFID antenna mounted on the frame outside of the electronics control box; an RFID reader housed within the electronics control box, said RFID reader coupled to the RFID antenna and being configured to interrogate an RFID tag on an article on the device that is in the field of view of the RFID antenna; and a communications device coupled with the RFID reader and adapted to be operably linked to a remote computing device.

In another aspect, and exemplary embodiment of the present disclosure may provide a method of reading a Radio Frequency Identification (RFID) tag on an article comprising moving a mobile RFID asset tracker into a vicinity of the article that includes the RFID tag; sending a query signal from an RFID reader housed within an electronics control box of the mobile RFID asset tracker to an RFID antenna mounted on a frame of the mobile RFID asset tracker a distance from the electronics control box; sending the query signal from the RFID antenna to the RFID tag on the article; reading data encoded on the RFID tag with the RFID reader.

In one embodiment, the method may further comprise coupling the RFID reader and the RFID antenna with a Printed Circuit Board (PCB) control module housed within the electronics control box; and saving the read data into a memory of the PCB control module. In one embodiment, the method may further comprise coupling the RFID reader and the RFID antenna with a PCB control module housed within the electronics control box; coupling the PBC control box with a communications device housed within the electronics control box; and transmitting the read data to a remote electronics device with the communications device. In one embodiment, the method may further comprise generating an indicator with an indicator assembly provided on the tracker when the RFID reader reads the RFID tag on the article. In one embodiment, the generating of the indicator may include one or more of illuminating a light on light stack mounted on the frame outside of the electronics control box, displaying text or an image on a display screen mounted on the frame outside of the electronics control box, and generating a sound with a sound generator located inside or outside of the electronics control box.

19. In one embodiment, the method may further comprise powering the RFID antenna, the RFID reader, the PCB control module, and the indicator assembly with a power source housed within the electronics control box. In one embodiment, the method may further comprise adjustably mounting one or both of the electronics control box and the RFID antenna on the frame of the mobile RFID asset tracker. In one embodiment, the moving of the mobile RFID asset tracker may include rolling the mobile RFID asset tracker across a floor of a facility on casters. In one embodiment, the moving of the mobile RFID asset tracker may be accomplished by a single human operator pushing or pulling the mobile RFID asset tracker by hand. In one embodiment, the RFID reader may include or be coupled with an RFID writer and the method further comprises writing data to the RFID tag.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
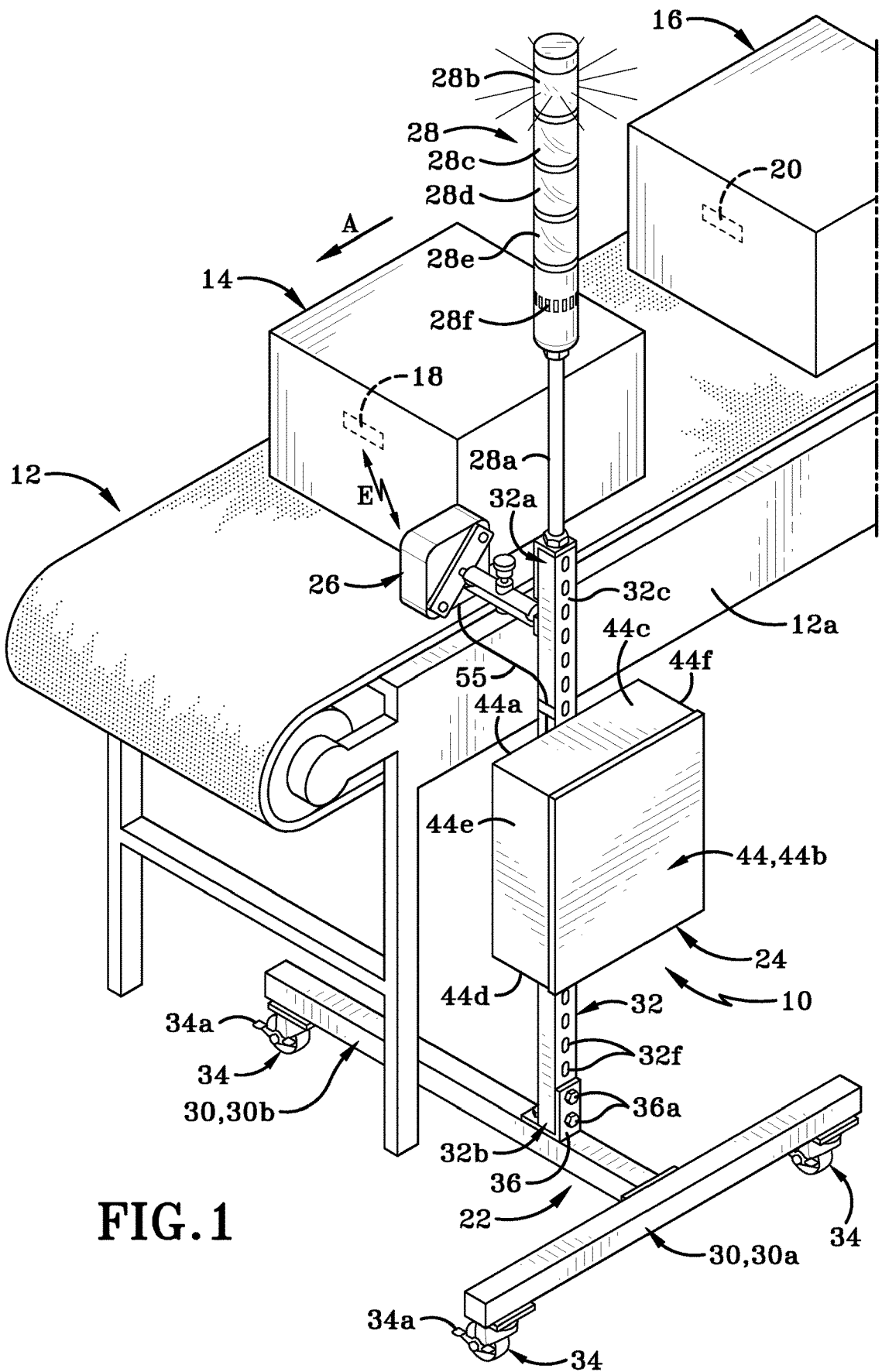
FIG. 1 is top, rear, right side isometric perspective view of a mobile Radio Frequency Identification (RFID) asset tracker in accordance with an aspect of the present disclosure shown located in the proximity of a conveyor that is transporting a plurality of RFID-tagged assets therealong.

Referring to FIG. 1, a mobile Radio Frequency Identification (RFID) asset tracker is illustrated, generally indicated by the reference character 10. The mobile RFID asset tracker 10 will be referred to herein as "tracker 10". Tracker 10 is configured to be easily moved between multiple areas of a facility (e.g. a factory floor) and is useful to perform a variety of different tasks. Tracker 10 as will be described hereafter weighs approximately 50 pounds and is therefore sufficiently light enough in weight to enable a single human operator to move the tracker 10 from one location in a facility to another. As will be described hereafter, tracker 10 includes casters or wheels and the single human operator is therefore able to push or pull the frame to move the tracker 10 by hand, rolling it across a floor surface in a factory, for example. No motor or other mechanism for moving tracker 10 is required although, if desired, tracker 10 could be motorized.

Tracker 10 is illustrated in FIG. 1 being used to perform one exemplary task, namely, monitoring work in progress in a facility. Specifically, the exemplary task illustrated in FIG. 1 shows tracker 10 located in proximity to a conveyor 12 along which a plurality of items, articles, parts, products, containers, or assets are traveling. The terms "item", "article", "part", "product" "container" and "asset" will be used interchangeably herein to denote anything to which an RFID tag is applied on in which an RFID tag is embedded. It should also be understood that conveyor 12 is exemplary of any device or vehicle that holds, carries, and/or transports one or more RFID tagged articles or items thereon.

FIG. 1 shows a first asset 14 and a second asset 16 being moved by conveyor 12 in the direction indicated by arrow "A". Each of the assets 14, 16 has been RFID tagged. Specifically, the first asset 14 has a first RFID tag 18 and the second asset 16 has a second RFID tag 20. As illustrated, the RFID tags 18, 20 are embedded within an interior of the product or within an interior of the product packaging. In other embodiments, the RFID tags may be applied to an external surface of the product. The RFID tags 18, 20 are encoded with relevant information relating to the associated asset 14 or 16.

Tracker 10 is configured to scan the first and second RFID tags 18, 20 provided on the first and second assets 14, 16 and to store the information coded on the RFID tags 18, 20. Other possible tasks for which tracker 10 may be used will be discussed later herein.

Figure 2:
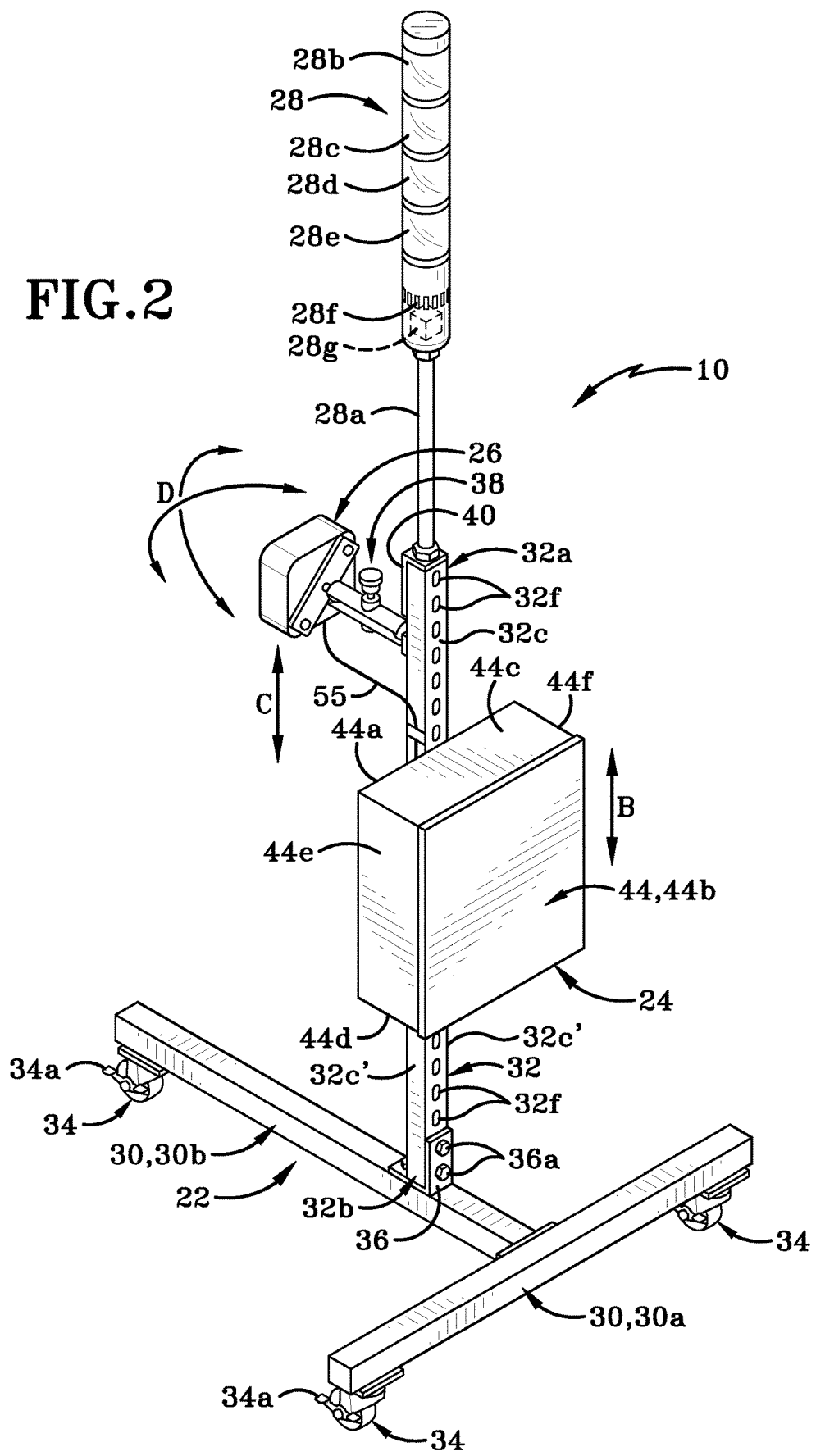
FIG. 2 is a top, rear, right side isometric perspective view of the mobile RFID asset tracker of FIG. 1 shown in isolation.
Figure 3:
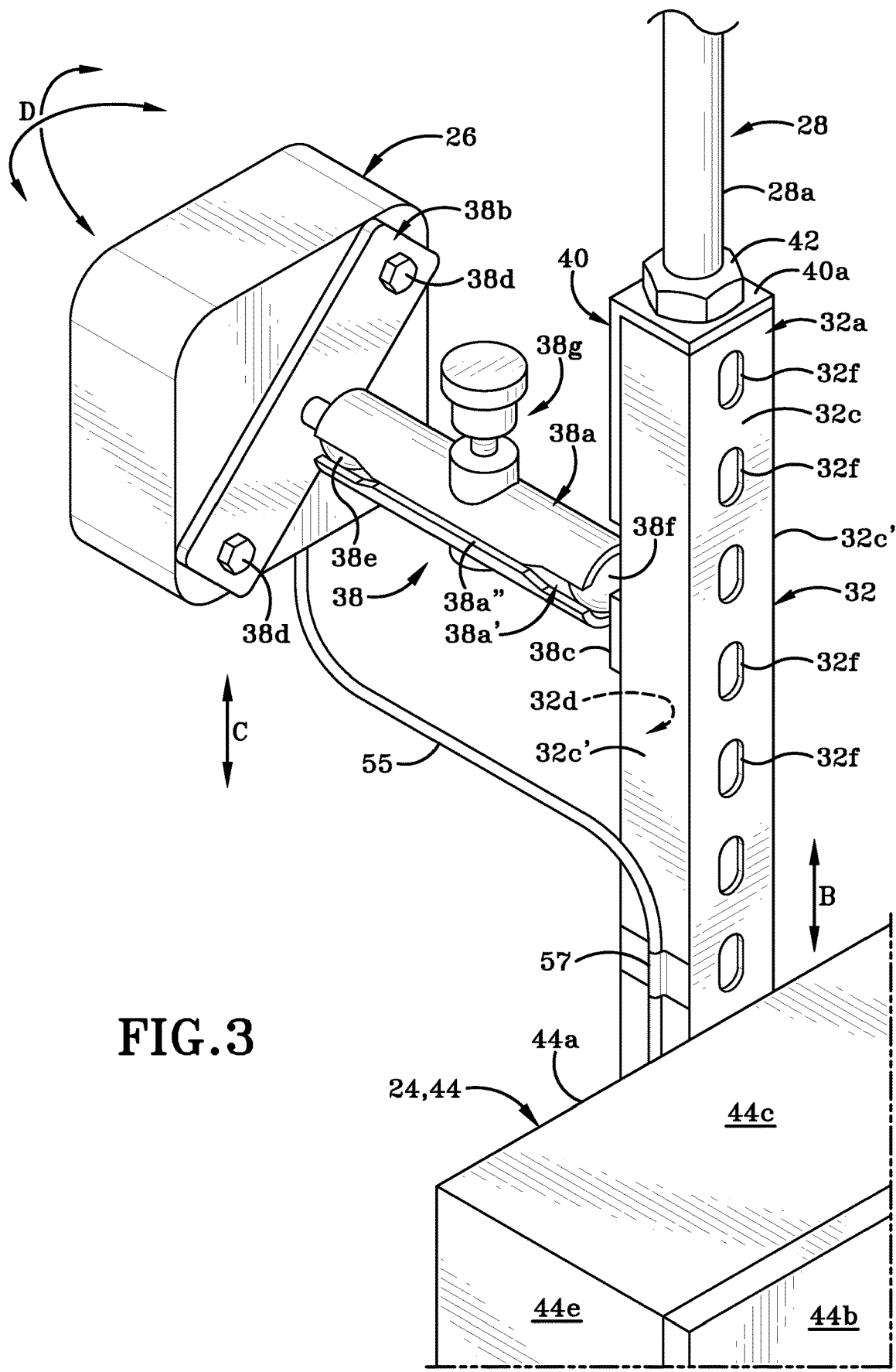
FIG. 3 is an enlarged partial top, rear, right side isometric perspective view of the mobile RFID asset tracker of FIG. 2 showing an upper region of a vertical strut thereof and showing the adjustable engagement of an RFID antenna and an electronics control box with the vertical strut.

Referring to FIG. 2, tracker 10 comprises a support frame 22 that enables an end-user the flexibility to mount various pieces of equipment to tracker 10 in any desired positions to suit the end-user's needs. For example, the end-user is able to operatively engage an electronics control box 24, an RFID antenna 26, and an indicator assembly at desired locations and orientations on support frame 22, as will be described later herein. An exemplary indicator assembly is illustrated in FIGS. 1 to 3 in the form of a light stack 28. Other types of indicator assembly will be described later herein.

Support frame 22 comprises modularly connected frame components which include a base 30 and a vertical strut 32. Base 30 is comprised of a rear strut 30a and a front strut 30b which are connectable to form a T-shape when viewed from above. The rear strut 30a and front strut 30b will be horizontally-oriented in normal operation of tracker 10. In one embodiment, the modular components of the base 30 (i.e., rear strut 30a and front strut 30b) may be fabricated from 2"×2" box metal that is 14 gauge. Front strut 30b is oriented orthogonally to rear strut 30a and is connected in suitable manner to a central region thereto. Front strut 30b may, for example, be bolted to a center of rear strut 30a through a two-hole flange welded to the front strut 30b. In other embodiments, front strut 30b may be welded to rear strut 30b. Front strut 30b may be of a greater length than rear strut 30a.

A plurality of rolling, lockable casters 34 are bolted by an end-user on the underside of base 30 to enable support frame 22 to be movable across a surface from a first location to a second location within a facility. Any suitable number of casters 30 are utilized to ensure smooth movement of tracker 10 across the surface upon which tracker 10 stands. As illustrated, three casters 34 are bolted to base 30, with one caster 34 being secured to each end of rear strut 30a and a caster 34 being secured to a free end of front strut 30b. Each caster 34a includes a locking mechanism 34a which is selectively moved between a locked position and an unlocked position. When the locking mechanism 34a is in the unlocked position, the tracker 10 is able to be rolled across the surface upon which the support frame 22 stands. When the locking mechanism 34a is in the locked position, the tracker 10 is no longer able to be rolled across the surface but remains fixed in place.

Vertical strut 32 is able to be installed on base 30 by an end-user. In one embodiment vertical strut 32 may be fabricated from 14 gauge 1⅝"×1⅝" strut material. Vertical strut includes a first end 32a and a second end 32b and is arranged to be orthogonal relative to base 30. In particular, vertical strut 32 is oriented with the first end 32a being located a distance vertically above where the second end 32b engages base 30. As illustrated, second end 32b is secured to front strut 30b in a region located forwardly of where front strut 30b intersects rear strut 30b. Second end 32b is bolted to base 30 by way of a mounting bracket 36. Vertical strut 32 will be secured to base 30 in any suitable location that provides tracker 10 with stability when it is moved across a surface or when it is at rest. The term "stability" is used to indicate that the assembled tracker's center of gravity is such that the tracker 10 will not tend to tip over when tracker 10 is rolled across the surface upon which it stands or when the tracker 10 is stationary.

Vertical strut 32 may be of any suitable cross-sectional configuration. In the embodiment illustrated in FIG. 5, vertical strut 32 is U-shaped in cross-section and includes a central wall 32c and two side walls 32c' (FIG. 5) that extend outwardly in the same direction from opposite sides of central wall 32c. Each side wall 32c' includes a U-shaped region 32c" remote from central wall 32c. The U-shaped regions 32c" are arranged as mirror images of one another. Central wall 32c, side walls 32c' and regions 32c" bound and define a channel 32d that extends from proximate first end 32a of vertical strut 32 to proximate second end 32b thereof. Inner edges of regions 32c" define a slot 32e between them that is in fluid communication with channel 32d. Central wall 32c defines a series of through-apertures 32f extending from one side of central wall 32c to the opposing side thereof. Apertures 32f may be defined at regular intervals from one another along substantially the entire height of vertical strut 32, i.e., between first end 32a and second end 32b. Each aperture 32f is generally elliptical in shape and is arranged so that the aperture is longer in a direction parallel to a vertical axis of the vertical strut 32. (The vertical axis of strut 32 will extend between first end 32a and second end 32b thereof.) The plurality of elongate apertures 32f provide a variety of different possible adjustable locations at which the end-user may selectively engage the other components of the tracker 10, as will be discussed later herein.

FIG. 2 shows that both the control box 24 and RFID antenna 26 are able to be mounted in desired locations and orientations on vertical strut 32 by an end-user. In particular, when the end-user receives the disassembled mobile RFID asset tracker and has assembled frame 22, the control box 24 is able to be secured by the end-user to vertical strut 32. For example, rivet nuts 33a (FIG. 4) are engaged with the wall 44a of the housing 44 and fasteners 33b are inserted through selected apertures 32f defined in vertical strut 32 and into rivet nuts 33a. This arrangement helps to ensure that the end-user does not need to open housing 44 in order to secure control box 24 to vertical strut 32. The correct length fasteners 33b must be utilized for this purpose so as to avoid damaging any electrical and electronic components within the interior of control box 24. If the user decides it is advantageous for some reason to position the control box 24 further away from base 30 or closer to base 30, the user will simply remove the fasteners 33b, raise or lower control box 24 to a new desired location along vertical strut 32, as indicated by arrow "B" (FIG. 3), and then reengage the fasteners 33b. This adjustability allows the end-user the flexibility to select the height of the control box 24 relative to the base 30 to suit their particular usage and facility.

RFID antenna 26 is able to be secured by an end-user to vertical strut 32 in a different manner to the manner in which control box 24 is engaged with vertical strut 32. RFID antenna 26 is a fixed-mount Ultra High Frequency (UHF) antenna. One suitable type of RFID antenna 26 that may be used in tracker 10 is the TIMES-7® ultra-low profile A5020 antenna. (TIMES-7® is a registered trademark of TIMES-7 HOLDINGS LIMITED of Lower Hutt, New Zealand). The A5020 has a compact design that makes it particularly suitable for applications where there is a confined read zone, is IP68 rated (i.e., suitable for outdoor applications), and has a beam-width of about 100°. Additionally, the A5020 is capable of operating at low-temperature extremes and is water and general cleaning agent resistant.

RFID antenna 26 is installed with vertical strut 32 via a mounting assembly 38 (FIG. 3) which will be described in greater detail later herein. The location at which the mounting assembly 38 is able to be engaged with vertical strut 32 is adjustable. The end-user has the flexibility to decide where to engage the mounting assembly 38 on the vertical strut 38 and thereby can position the RFID antenna at a height relative to the base 30 suitable for any particular interrogation operation in the end-user's facility. The mounting assembly's position on vertical strut 32 can readily be changed by raising or lowering the mounting assembly 38 relative to the base 30. This adjustability in the vertical height of the mounting assembly 38 is indicated by the arrow "C" in FIG. 3. Additionally, the orientation of the RFID antenna 26 on mounting assembly 38 is readily adjusted through a wide range of angles about a central point. Exemplary angular adjustment of the RFID antenna 26 relative to the mounting assembly 38 is indicated by the arrows "D" in FIG. 3. This aforementioned adjustability helps to give the end-user the flexibility to customize the RFID asset tracker 10 for reading tagged assets 14, 16 (FIG. 1) in the end-user's particular facility or process.

Mounting assembly 38 comprises a ball-and-socket arm that includes a C-shaped sleeve 38a, a mounting plate 38b, and a mounting bracket 38c. Sleeve 38a is an elongate, generally cylindrical component which defines an interior bore 38a' which extends from proximate a first end of the sleeve 38a to proximate a second end thereof. Sleeve 38a also defines a longitudinally-oriented slot 38a" that also extends from proximate the first end of the sleeve 38a to proximate the second end thereof and is in fluid communication with bore 38a'.

Mounting plate 38b and mounting bracket 38c are engaged at opposed ends of sleeve 38a. Mounting plate 38b is operatively engaged with RFID antenna 26 in any suitable manner, such as by using fasteners 38d (FIG. 3), for example. Mounting bracket 38c is operatively engaged with vertical strut 32 in any suitable manner. In one embodiment, mounting bracket 38c may be a spring loaded fitting that is received into channel 32d defined by central wall 32c and side walls 32c' of vertical strut 32 and is retained thereby by friction. The end-user may be able to slide mounting bracket 32c upwardly or downwardly within channel 32d to select at which height, relative to base 30, to install RFID antenna 26. In other embodiments, mounting bracket 38c may be selectively bolted to vertical strut 30 using bolts inserted through one or more apertures 32f and engaging nuts therewith.

A first ball 38e is provided at the end of a post which extends outwardly from a surface of mounting plate 38b. The first ball 38e is seated within a first socket defined at the first end of the sleeve 38a. A second ball 38f is operatively engaged with mounting bracket 38c and is seated within a second socket defined at the second end of the sleeve 38a.

Mounting assembly 38 further includes a clamping mechanism 38g is provided proximate a central region of sleeve 38a. The clamping mechanism 38g is selectively rotatable in a first direction to apply a clamping force to sleeve 38a in order to narrow a width of slot 38a". When the clamping force narrows the width of slot 38a" sufficiently, first ball 38e and second ball 38f become locked against any motion within bore 38a' of sleeve 38a. Clamping mechanism is selectively rotatable in an opposite second direction to release clamping force applied to sleeve 38a. The removal of the clamping force allows slot 38a" to return to its widest width. When clamping mechanism 38g is rotated in the opposite, second direction to a sufficient degree, the width of slot 38a" increases to the point that first ball 38e and second ball 38f are able to rotate within bore 38a' of sleeve 38. Each of the first ball 38e and second ball 38f is rotatable about a central point to all the end-user to adjust the position of RFID antenna 26 up-and-down, side-to-side, and to tilt the RFID antenna 26 to a wide range of different angles and positions.

If the user wishes to change an orientation of the RFID antenna 26 relative to vertical strut 32 this can be accomplished in two ways. Firstly, the position of the RFID antenna 26 relative to sleeve 38a may be adjusted by rotating first ball 38e within the first socket of sleeve 38a about a center point of the first ball 38e. Secondly, the position of RFID antenna 26 and sleeve 38a relative to vertical strut 32 may be adjusted by rotating second ball 38f within the second socket of sleeve 38a about a center point of the second ball 38f. In some instances, the end-user may wish to adjust the position of RFID antenna 26 relative to sleeve 38a and relative to vertical strut 32. In this instance, the user may release the clamping mechanism 38a and rotate both the first ball 38e and second ball 38f relative to the sleeve 38a. When the desired orientation of RFID antenna 26 is achieved, the RFID antenna 26 is locked in that orientation by rotating the clamping mechanism 38g so as to reapply clamping force to the sleeve 38a, and thereby locking the first and second balls 38d, 38e in the selected orientations.

As best seen in FIGS. 2 and 3, light stack 28 is operably engaged with first end 32a of vertical strut 32. Light stack 28, as illustrated, is a four-color light stack that is used to give visual indicators of the RFID read process (as will be described later herein.). In particular, an L-shaped mounting bracket 40 is engaged with first end 32a in any suitable manner. Light stack 28 includes a shaft 28a and a Light Emitting Diode (LED) array 28b provided at one end of shaft 28a. An opposed free end of shaft 28a may be inserted through an aperture (not shown) defined in a horizontal leg 40a (FIG. 3) of mounting bracket 40 and into the channel 32d defined by vertical strut 32. A locking nut 42 is provided to selectively engage shaft 28a and to lock the same to mounting bracket 40.

As illustrated, the LED array includes a first light 28b, a second light 28c, a third light 28d, and a fourth light 28e. Each of the first, second, third, and fourth lights 28b through 28e is individually able to be activated to emit light. By way of example only, light stack 28 includes an exterior case that has four differently colored regions so that the light emitted by light stack 28 will be one of those four colors. For example, the portion of the casing of light stack 28 that circumscribes first light 28b may be red, the portion of the casing circumscribing second light 28c may be orange, the portion of the casing circumscribing third light 28d may be green, and the portion of the casing circumscribing fourth light 28e may be blue.

It will be understood that in other embodiments, the light stack 28 may include fewer than four lights or more than four lights. It will further be understood that the arrangement of the colors of the casing portions may be other than described above. Still further, instead of colored casing portions to make the light emitted of different colors, the LEDs themselves may emit light of any desired color and the casing may be transparent.

In one embodiment, light stack 28 includes a plurality of apertures 28f defined in a base region. A sound generating mechanism 28g (FIG. 2) may be provided within the interior of the base region and sounds, such as for an alarm may be emitted through apertures 28f. In other instances, apertures 28f may simply be ventilation ports for enabling loss of any heat generated by light stack 28.

While the sound generating mechanism is illustrated as being provided on light stack 28, in other embodiments, the sound generating mechanism may be housed within an interior of control box 24 or may be mounted independently on frame 22.

Tracker 10 is readily and easily customizable by the end-user. Typically, once control box 24 is engaged with vertical strut 32 it will remain in place at all times in a facility. However, should it be desired to adjust the position of control box 24 on vertical strut 32, the end-user simply has to undo a few nuts, withdraw the associated bolts, select a new location for control box 24 on vertical strut 32 and then reengage the bolts and nuts.

Tracker 10 is further readily adjustable by the end-user with respect to the position of RFID antenna 26. If a spring loaded mounting bracket 38c (FIG. 3) is utilized to engage RFID antenna 26 to vertical strut 32, the end-user will depress the spring-loaded arms of the spring-loaded mounting bracket 38c and slide the bracket 38c upwardly towards first end 32a of vertical strut 32 or downwardly towards second end 32b of vertical strut 32. When the desired height of RFID antenna 26 is reached on vertical strut 32, the end-user will simply release the spring-laded arms of the spring-loaded mounting bracket 38c and the mounting assembly 38 will then be locked at that height relative to base 30. If the tracker 10 is to be used elsewhere in the facility, the tracker 10 is wheeled to the new location and the position of the RFID antenna 26 is readily adjusted to a new location along vertical strut 32 as described above. The user is able to readily adjust the tilt or angle of the RFID antenna 26 by releasing the clamping mechanism 38g and rotating the position of RFID antenna 26 rotating the antenna 26 and/or the sleeve 38a relative to the first ball 38e and/or second ball 38f, as desired, and then engaging the clamping mechanism 38g once again as has been described earlier herein.

Tracker 10 is further readily adjustable by the end-user with respect to the position of the LED array 28b relative to base 30. As discussed above, the locking nut 42 is loosened, the length of shaft 28a is increased or decreased as desired, and then the locking nut 42 is tightened once again.

Now that the components of the tracker 10 have been generally described, more detail is provided hereafter with respect to the control box 24, the RFID antenna 26, and the light stack 28.

Figure 4:
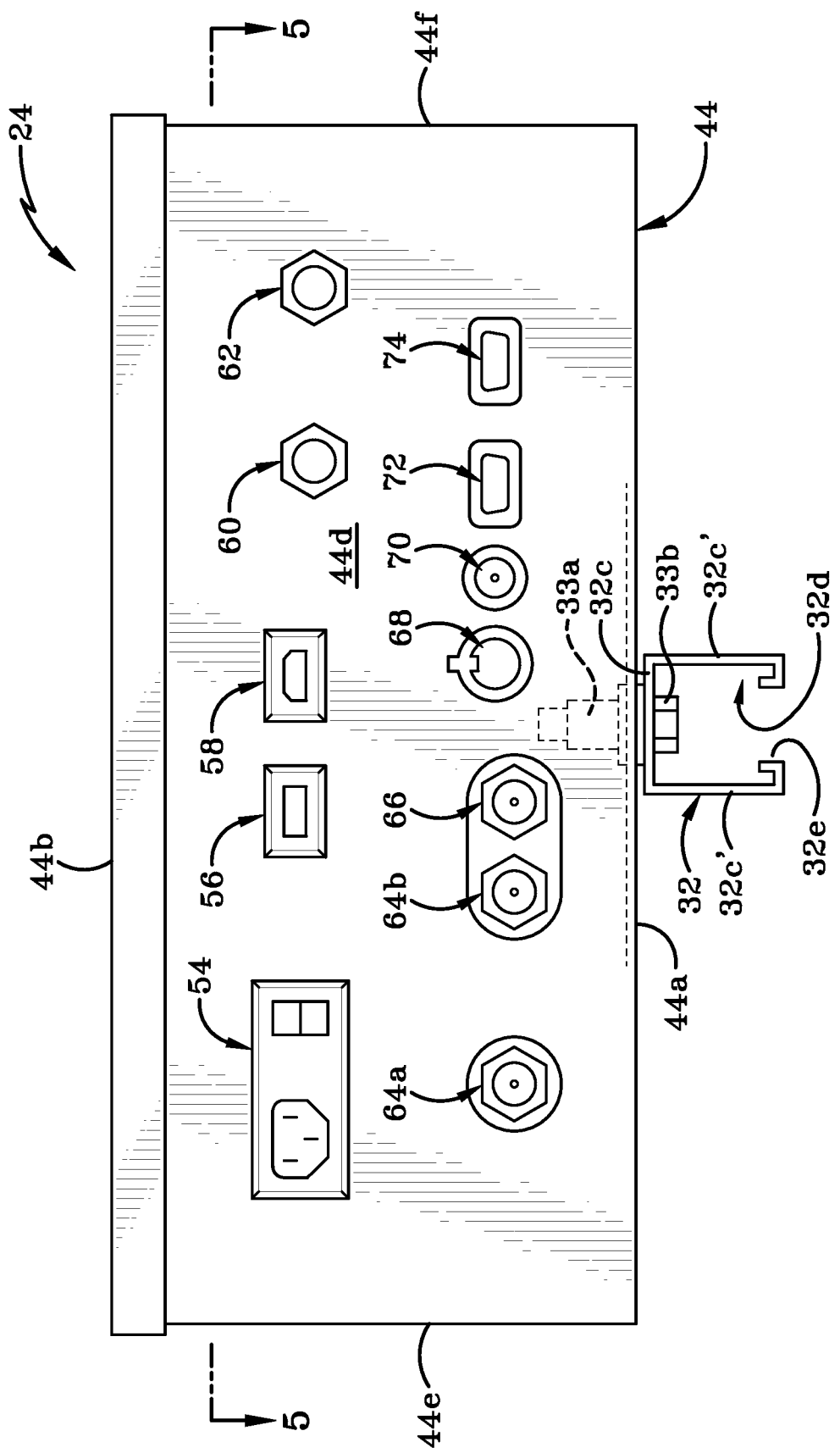
FIG. 4 is a bottom plan view of the electronics control box engaged with the vertical strut.
Figure 5:
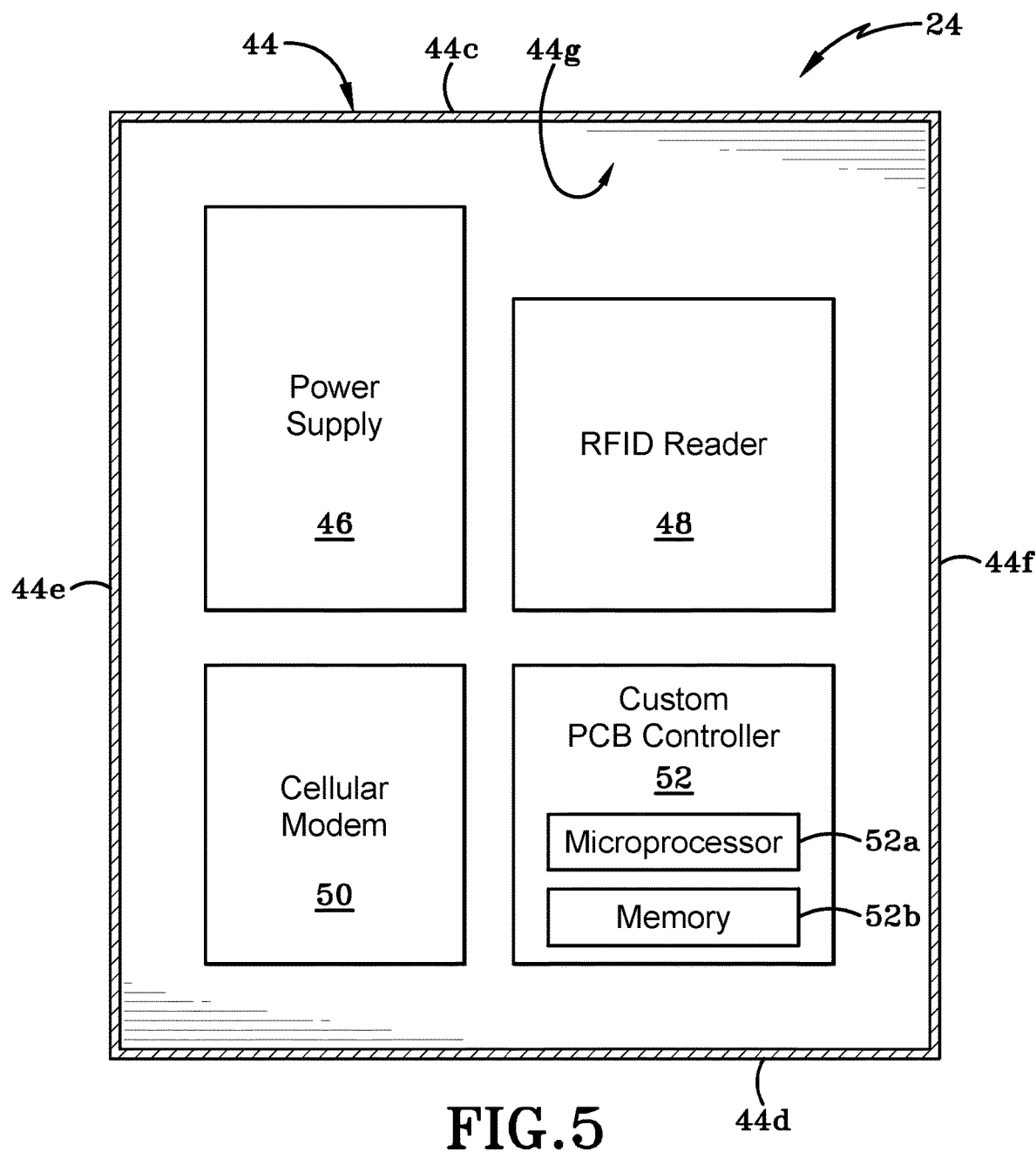
FIG. 5 is a diagrammatic rear elevation view of the interior of the electronics control box with the rear panel thereof removed.

Turning now to FIGS. 4 and 5, control box 24 comprises a housing 44 that is mounted onto vertical strut 32. A plurality of components that are housed within housing 44 are discussed hereafter. Housing 44, as illustrated, is a rectangular cuboid in shape and includes a front panel 44a, a back panel 44b (in the form of a door or cover), a top panel 44c, a bottom panel 44d, a left side panel 44e, and a right side panel 44f. Front panel, back panel, top panel, bottom panel, left side panel, and right side panel, 44a-44f, bound and define an interior compartment 44g in which various components are housed.

Vertical strut 32 is oriented on base 30 in such a way that central wall 32c faces rearwardly toward rear strut 30a. The front panel 44a of housing 44 is bolted to central wall 32c as previously described herein. It should be noted that for any particularly sized vertical strut 32, specifically-sized bolts should be used to secure housing 44 in place so that accidental contact is not made between the bolts and the electrical components housed within control box 24. For example, a bolt of ¾" and no large may be used to secure control box 24 to vertical strut 32 if the strut is made from 1⅝"×1⅝" strut material. When control box 24 is engaged with vertical strut 32 as described above, rear panel 44b of housing 44 faces rearwardly toward rear strut 30a of base 30. This arrangement is selected to provide some physical protection from conveyor belt operations and other material handling equipment external to the mobile asset tracker 10 which conveyor belt 12, for example, or other material handling equipment may come into the proximity of the tracker 10. The vertical strut 32 provides some physical protection against impact to control box 24. For example, referring to FIG. 1, if tracker 10 is moved to close to a side wall 12a of conveyor 12 as a user slides front strut 30b under the bottom of conveyor 12, the vertical strut 32 of tracker 10 will impact the side wall 12a instead of control box 24 striking side wall.

Control box 24 is unique in that it houses equipment that powers, provides communications, includes direct I/O, and monitors RFID activity in a single, self-contained, plug-and-play control module. FIG. 5 shows control box 24 housing a power supply 46, an RFID reader 48, and a communications device configured to communicate with a remote computer processing unit. The communications device as illustrated in FIG. 5 is a cellular modem 50. The control box 24 also houses a custom Printed Circuit Board (PCB) control module 52 that is provided with programming to control and monitor the operation of all equipment on tracker 10. Control module 52 also includes one or more microprocessors 52a (FIG. 5) and a memory 52b. When the RFID tags 18, 20 send data back to the RFID reader 48, the data is stored either temporarily or permanently in the memory 52b. The data sent by the RFID tags 18, 20 may be encrypted data. Power supply 46 provides controlled power to the RFID reader 48, cellular modem 50, control module 52, and light stack 28.

The power supply 46, RFID reader 48, cellular modem 50, and control module 52 are coupled with one another and with the RFID antenna 26 and light stack 28 via various wires and cables. The wiring and cables have been omitted from the figures for clarity of illustration. The exception is a coaxial cable 55 shown in the figures which is connected to RFID antenna 26 at one end and runs along one of the side walls 32c' of vertical strut 32. A cable tie 57 (FIG. 3) illustrates one way in which the various cables and wiring may be arranged on tracker 10 when extending from control box 24 to other pieces of equipment provided on tracker 10. Instead of or as well as having cables running along an exterior surface of vertical strut 32, other cables or wiring may be threaded through the channel 32d defined by vertical strut 32.

In one embodiment, the housing 44 of control box 24 has the following ratings: UL5084 type 12 and 13, CSA type 12 and 13, and Nema type 12 and 13, IED 60529 and IP54. The steel body is 14" gauge box metal with welded brackets for mounting the enclosure. The outer finish is phosphatized and finished in ANSI 61 gray powder coated with cutouts for antennas and wiring. Wiring can easily connect and disconnect at ports (discussed hereafter) on the outside of the box 24, most specifically on bottom panel 44d thereof.

As indicated above, control box 24 houses the power supply 46, RFID reader 48, cellular modem 50, and control module 52 which provided Input/Output (I/O) controls to trigger the equipment on tracker 10 including the visual indicators (i.e., light stack 28). As shown in FIG. 4, the bottom 44d of control box 24 contains all of the electrical connections for various equipment provided on tracker 10 and/or to allow the tracker 10 to be connected to remote equipment as needed. The connections include a power center and on/off switch 54, a Universal Serial Bus (USB) port 56, a High Definition Multimedia Interface (HDMI) port 58, an antenna cable to antenna port 1 indicated by reference character 60, an antenna cable to antenna port 2 indicated by reference character 62, left and right antenna ports 64a, 64b; a cellular modem Global Positioning System (GPS) port 66, a light stack cable port 68, a start button plug in 70, a barcode reader port 1 indicated by reference character 72, and a barcode reader port 2 indicated by reference character 74. All access to equipment is done through the outside of the box 24, therefor there should be little to no need to open up the control box 24. It should be noted that when the end-user purchases tracker 10, all of the equipment shown in FIG. 5 and discussed above is already housed within the interior 44g of housing 44 of control box 24 and is ready for use as soon as power is provided to the same.

In one embodiment, power supply 46, which is operatively linked to the power center and on/off switch 54 on bottom panel 44d (FIG. 4), is a 24V Direct Current (DC) supply which provides DC current RFID reader 48, the communications device, i.e., cellular modem 50, to control module 52, and to the indicator assembly, e.g., light stack 28.

Figure 7:
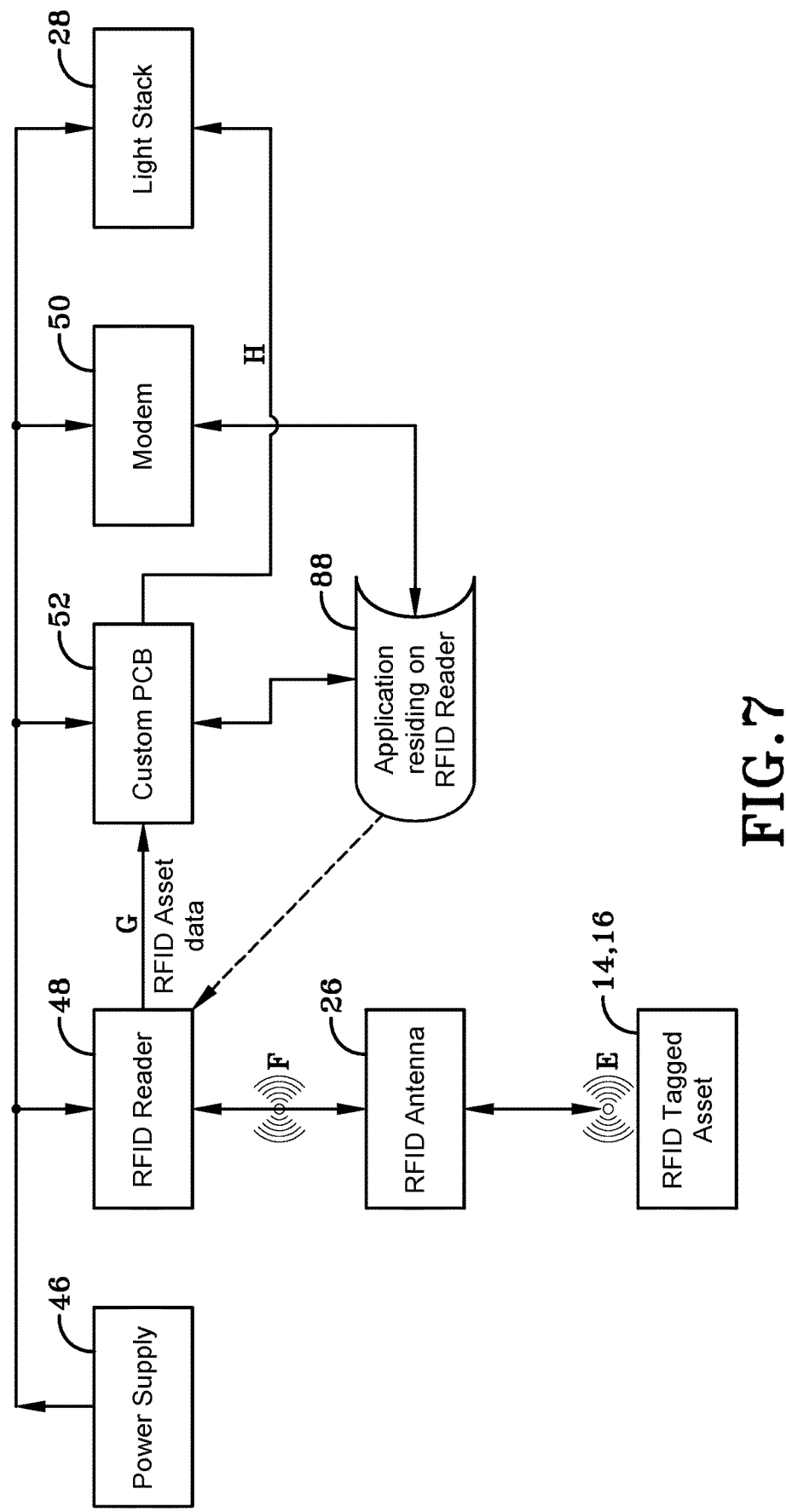
FIG. 7 is a flow chart of the hardware connectivity and process flow of the mobile RFID asset tracker.

RFID reader 48 is a 1 port or 2 port Ultra High Frequency RFID reader (UHF RFID reader). RFID antenna 26 supported on vertical strut 32 is operatively linked to RFID reader 48 in any suitable manner such as via a coaxial cable 55 (FIG. 1). Coaxial cable 55 is connected to at one end to RFID reader 26 and at the other end to RFID reader 48 via the coaxial cable port 62 located on bottom panel 44d of control box 24. RFID antenna 26 when actuated will emit radio waves and receive signals back from the RFID tags 18, 20 on assets 14, 16. The emitted radio waves and received signals are indicated in FIGS. 1 and 7 by the reference character "E". Tags 18, 20 use radio waves to communicate their identity and other data to RFID antenna 26 and thereby to RFID reader 48 housing within control box 24. Tags 18, 20 may be active or passive RFID tags. RFID tags 18, 20 may store a variety of information that is transmitted to RFID reader 48 when the tags 18, 20 are activated.

Cellular modem 50 is a dual sim cellular modem. External cellular antennas may be connected to the modem 50 via the cellular antenna ports on the bottom panel 44d of control box 24. One suitable modem for use in tracker 10 is the COR IBR600C series manufactured by CRADLEPOINT®. (CRADLEPOINT® is a registered trademark of CradlePoint, Inc. of Boise IDAHO, USA.)

Electrical wires for the lights of light stack 28 are secured through the channel 38d defined in vertical strut 32 and are direct connected to control module 52 via the light stack port 68 on bottom panel 44d of control box 24.

Figure 6:
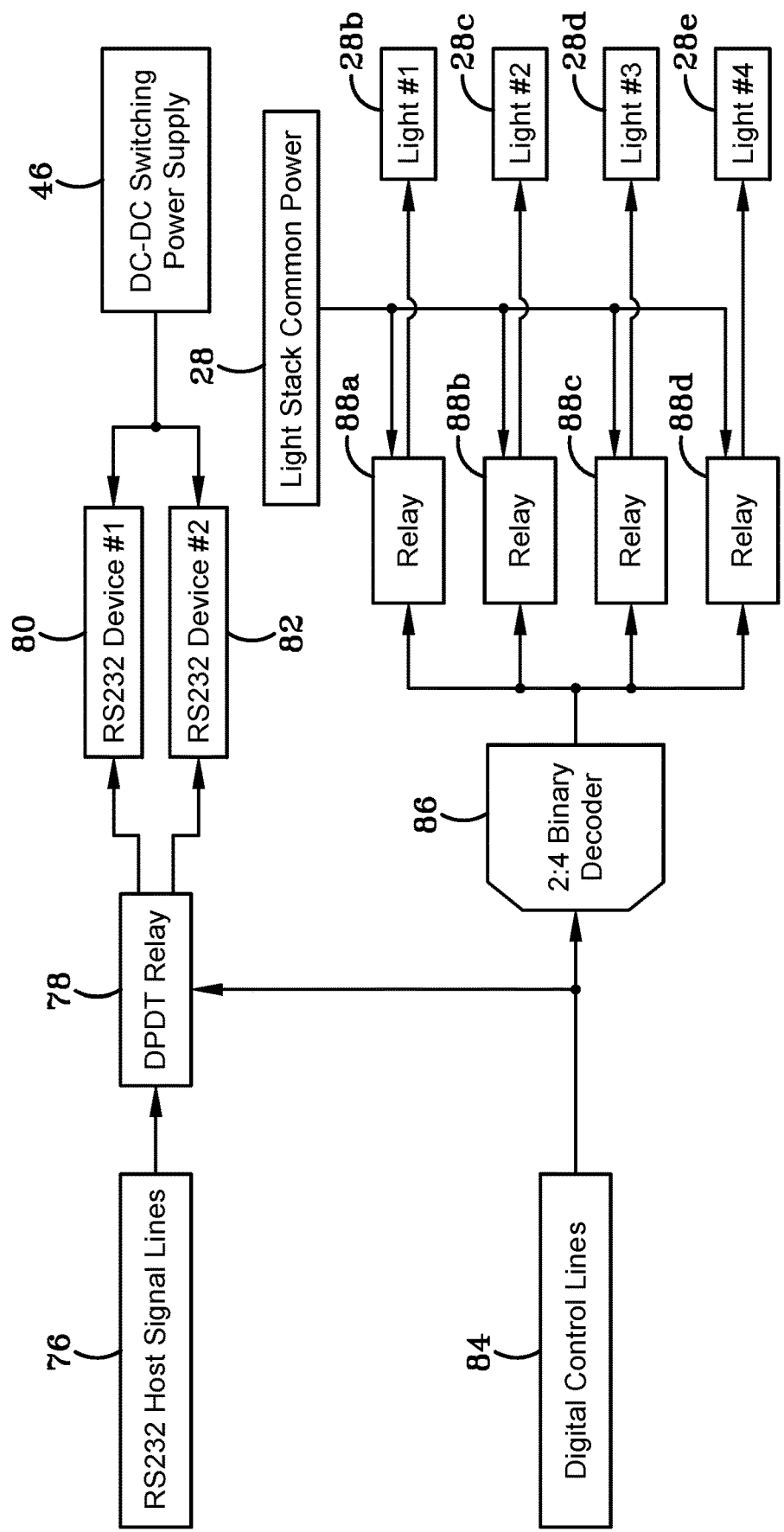
FIG. 6 is a block diagram of the end-user Printed Circuit Board Input/Output control module (PCB I/O control module) of the mobile RFID asset tracker of FIG. 2.

Referring to FIG. 6, the unique consolidation of I/O on a single control module (i.e., control module 52) combined with controlling software is an aspect of the present disclosure. Control module 52 in this instance provides for serial RS232 host signal input 76 from software to a double-pole, double-throw (DPDT) relay 78 which then sends a signal to serially connected devices 80, 82 such as barcode readers, optical sensors, noise generators, alarms, and motion detectors. The RS232 devices 80, 82 receive power from the DC/DC switching power supply 46. Control module 52, via digital control lines 84 also provides digital control I/O communications as an input to either a DPDT relay 78 or a 2:4 binary decoder 86. If the path follows the binary decoder 86, the input signal is sent to one of four relays, namely Relay 1 indicated by reference character 88a, Relay 2 indicated by reference character 88b, Relay 3 indicated by reference character 88c, and Relay 4, indicated by reference character 88d. All relays 88a through 88d receive power from the DCDC switching power supply 46 to power the light stack 28. Relay 1 (88a) outputs a signal to the first light 28b of the light stack 28, Relay 2 (88b) outputs a signal to second light 28c of the light stack 28; Relay 3 (88d) outputs a signal to the third light 28d of the light stack 28; and Relay 4 (88e) outputs a signal to the fourth light 28e of the light stack 28. When the respective light 28b through 28e receives the aforementioned signal, the light is illuminated.

An end-user will assemble tracker 10 in the following manner. In a first step, the end-user engages rear strut 30a and front strut 30b with one another. This may be accomplished by utilizing fasteners (not shown in the attached figured) to secure the rear strut 30a and front strut 30b to one another. In a next step, the end-user engages the vertical strut 32 to the base 30. This is accomplished by inserting fasteners 36a through mounting bracket 36 that is welded to front strut 30b and engaging nuts (not shown) therewith to lock fasteners 36a in place. Light stack 28 is then engaged with vertical strut 32 as previously described herein. The end-user will also engage mounting assembly 38 to vertical strut 32 at a desired location as previously described herein. Once mounting assembly 38 is engaged with vertical strut 32, the RFID antenna 26 will be operatively engaged with sleeve 38a of mounting bracket 38.

Electronic control box 24 is also mounted to vertical strut 32 at a desired height from base 30 as has been described earlier herein. As mentioned earlier herein, electronic control box 24 is mounted on central wall 32c which comprises a rear surface of vertical strut 32.

After the tracker 10 is initially assembled, wiring and cables for any equipment mounted on vertical strut 32 are engaged with that equipment and with the connections on bottom panel 44d of control box 24. For example, an antenna cable small connector is attached to the RFID antenna 26 and the antenna cable larger connector is attached to the Antenna 1 port 60 on bottom panel 44d of control box 24. Wiring from light stack 28 is plugged into the plug in line cord 68. If cellular antennas (not shown) for the cellular modem 50 are to be operatively engaged on vertical strut 32 they may be connected, via cables, to the left and right antenna ports 64a, 64b on bottom panel 44d of control box 24. A 120V8 Alternating Current (AC) power cord is selectively engaged with the power center 54 on bottom panel 44d and the "ON" button will be engaged. The electronic equipment on tracker 10 will then boot up. The operator will then set the rules under which the tracker 10 will operate as described below. It will be understood that the initial assembly and setup of tracker 10 will occur once and after that initial setup, the tracker 10 will be able to just be moved from one location to another for use.

Initial set up is accomplished using a remote computer (e.g. a CPU located outside of tracker 10) to communicate with the electronics of tracker 10. This communication may occur via modem 50. The operator (or person setting the operating rules for tracker 10) will access the programming stored in the memory 52b of processor 52a of control module 52 by navigating on their server (located on a remote central processing unit (CPU) and will select the various operating conditions from an easy to navigate menu. For example, the operator will select conditions under which the light stack 28 will display the various different colors of the first light 28b, second light 28c, third light 28d, and fourth light 28e. The operator will access a stored rules file, open the same with a text editor, and then select RFID tag rules to determine how tracker 10 will display visual indicators to the operator. A configuration file may be modified by the operator to set a power level of the RFID antenna 26, to select RFID tag sensitivity, to enter the Uniform Resource Locator (URL) of a host system where read RFID tag data is to be sent, and to select other operating parameters. For example, the operator will open the configuration file and select an RFID antenna for use if more than one RFID antenna is mounted on tracker 10. The operator will select the strength signal (TxPower) for the RFID antenna to determine the field of view or range of that RFID antenna. The TxPower default is "55". The higher the number selected, the stronger the signal strength from the RFID antenna. A higher signal strength enables the RFID antenna to read RFID tags located further away from RFID antenna. The operator will then select the RFID tag sensitivity (RxSensitivity) to set the strength of the read. RxSensitivity default is "1". The address of the URL to which read data is to be sent is also entered by the operator. The operator will also set the Heartbeat Rate, i.e., sets the number of milliseconds that the RFID reader 48 will send a signal to the remote CPU. Setting the Heartbeat Rate provides a notification if the RFID reader 48 is not online. Finally, the operator may set the LightTimeout. This selection sets the number of milliseconds that a light on light stack 28 stays on during a read of an RFID tag 18, 20 by RFID reader 48. Once the operator has made his or her selections, they will save their changes. The tracker 10 is then ready for use. As mentioned above, after initial setup, there may be no need to change any of these setting selections. It will be understood, however, that selected settings may readily and easily be modified in the same manner if it is later decided that a particular setting needs to be changed.

Referring to FIGS. 1 and 7, the end-user will unlock the locking mechanism 34a on casters 34 on tracker 10 and will roll tracker 10 from a first location where it was setup to a second location where the tracker 10 is to be used to read RFID tags on tagged assets 14, 16. For example, tracker 10 is rolled to a second location proximate a conveyor 12 of an assembly line as illustrated in FIG. 1. The conveyor 12 is switched on and the tagged assets 14, 16 are moved by the conveyor 12 in the direction "A" towards tracker 10. When a tagged asset, such as asset 14 or asset 16 comes into the field of view of RFID antenna 26, the RFID antenna 26 will interrogate the associate RFID tag 18, 20, i.e., it will detect and read the End Point Control (EPC) code and any populated user defined data on RFID tag 18 or 20. This is indicated in FIGS. 1 and 7 by the arrows "E". The electromagnetic energy from RFID antenna 26 may power the Integrated Circuit (IC) of RFID tag 18 or 20. The detected and read data is transmitted through the radiated power from the RFID antenna 26 back to the RFID reader 48 located within control box 24 as indicated in FIG. 7 by the reference character "F".

The data is outputted from RFID reader 48 to control module 52 (see arrow "G" in FIG. 7) through digital I/O and is interpreted through software 88 via corresponding paths for the relays 88a through 88d to output a signal path "H" to an indicator assembly to generate an indicator for the operator to see and/or hear. For example, the light stack 28 (i.e., the indicator assembly) will illuminate an appropriate light 28b-28e of light stack 28. For example, if a RFID tag 18 has been successfully read, the green light 28d may be illuminated but if the RFID tag 18 has not been successfully read, the red light 28b may be illuminated. Additionally, if provided as part of the indicator assembly on tracker 10, a sound generator may also generate a sound to coordinate with the illumination of the variously colored lights. The illumination of lights 28b through 28e is indicative of various process control conditions of which actions can be taken or further integration machine systems can be achieved. As mentioned earlier herein, the operator sets the conditions under which the indicator assembly will notify the operator of actions that have occurred.

During the above-outlined process, control module 52 directs the data traffic by sending I/O signals to the various output devices through either a received serial host signal 76 (e.g., a serial connected barcode reader or photo eye) or a received signal 78 (e.g. the RFID Ethernet based Reader 48). If the data input follows the serial path 76, control module 52 sends the signal directly to a DPDT relay 78. The DPDT relay 78 then directs the signal to one or more RS232 devices 80 and 82. If the data input follows the digital signal path 78, a signal is sent to the Binary Decoder 86 which parses various software-controlled conditions to direct the signal to a specific relay, e.g. relays 88a-88d. The signal is received by the different lights 28b-28e of different colors by the paired relays 88a-88d to trigger the associated indicator light 28b-28e to illuminate and/or flash. The binary decoder 86 can also send software-controlled signals through the relay switch 78 to trigger alarms, motion control devices, or other connected devices, thereby providing flexibility for visual or audible signals to an operator monitoring the assembly line or conveyor 12.

In addition to the I/O process, the cellular and WIFI modem 50 provides communications between the RFID mobile asset tracker 10 and back end systems. When the software of control module 52 initiates the capture of the RFID data from the RFID tags 18, 20 of the assets 14, 16, the data may be stored in the memory 52b of control module 52 or may be transmitted through either a cellular connection or a WIFI connection to the user-defined URL to interface the data to any back-end system.

When tracker 10 is no longer needed at conveyor 12, the system may be moved from one location within a facility to another. For example, tracker 10 may be rolled over to another conveyor or to a loading dock for use. When the services of tracker 10 are temporarily no longer required, the device may be moved to a storage location. The end-user is therefore able to set up an RFID tag reading terminal anywhere in their facility using the tracker 10 on an "as-needed" basis.

Figure 8:
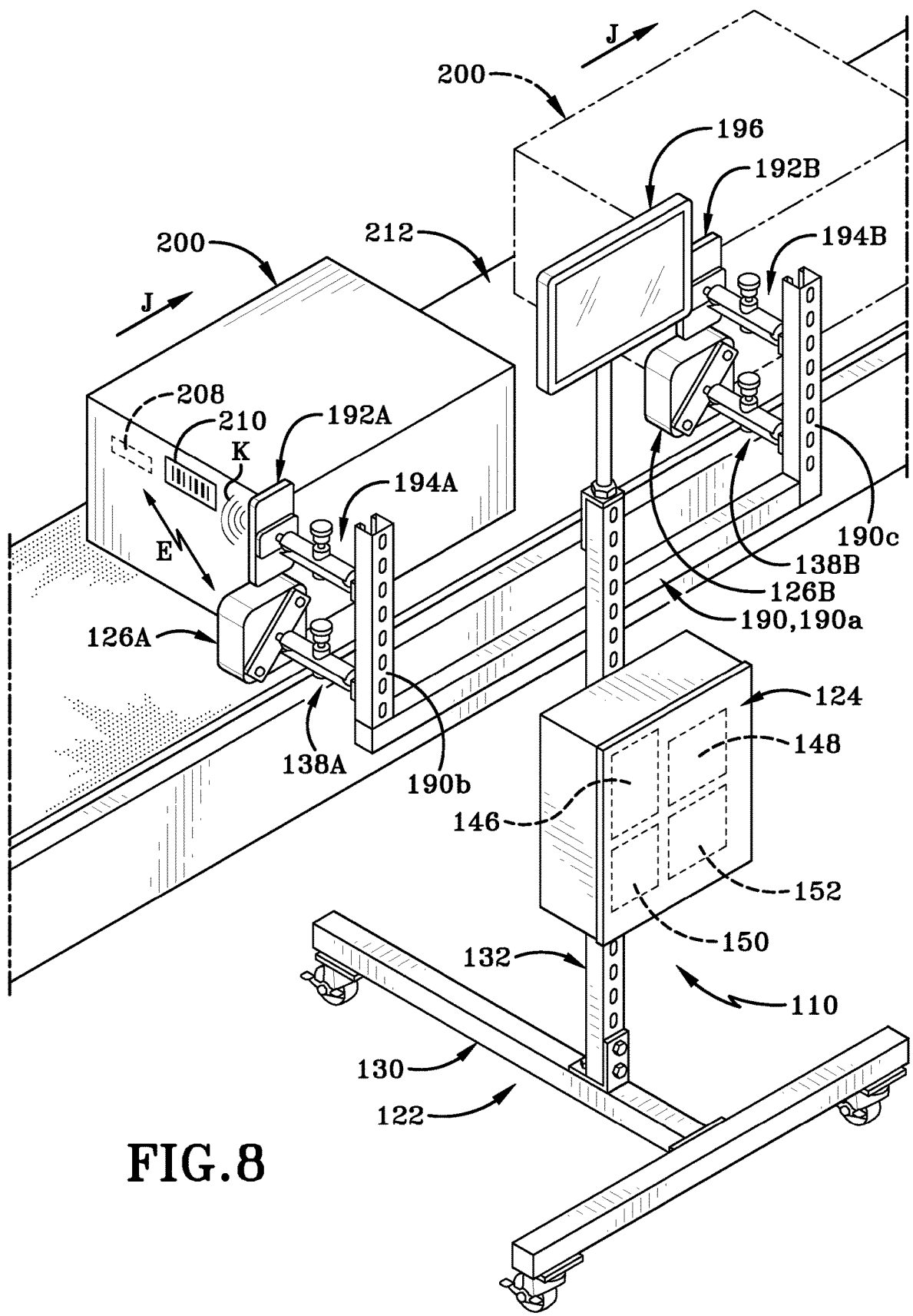
FIG. 8 is top, rear, right side isometric perspective view of a second embodiment of the mobile Radio Frequency Identification (RFID) asset tracker in accordance with an aspect of the present disclosure shown being used as a "birthing station" that writes information on RFID tags provided on assets as they are transported past the birthing station.
Figure 9:
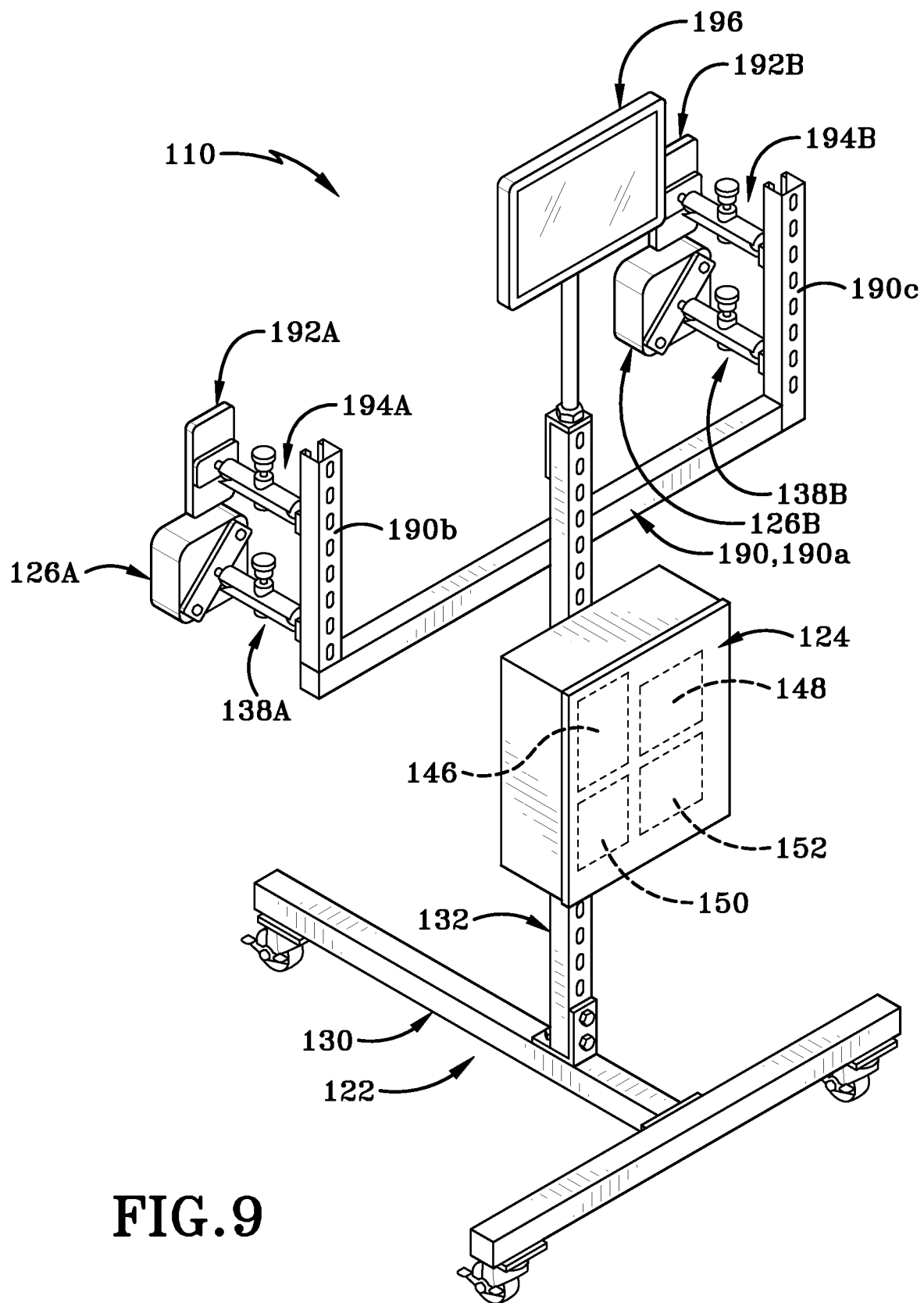
FIG. 9 is a top, rear, right side isometric perspective view of the second embodiment of the mobile RFID asset tracker of FIG. 8 shown in isolation.

Referring now to FIGS. 8 and 9, there is shown a second embodiment of a mobile RFID asset tracker in accordance with an aspect of the present disclosure, generally indicated at 110. Device 110 includes a support frame 122 upon which is mounted an electronics control box 124. Support frame 122 includes a base 130 and a vertical strut 132. Base 130 is substantially identical in structure and function to base 30 and vertical strut 132 is substantially identical in structure and function to vertical strut 32.

Electronics control box 124 is substantially identical in structure and function to control box 24 except for one feature that will be described hereafter. Control box 124 includes a power source 146 that is substantially similar to power source 46; a communications device such as a cellular modem 160 that is substantially identical to cellular modem 50, and a PCB controller 152 that is substantially identical in function to PCB controller 152. The PCB controller 152 may differ somewhat to PCB controller 52 to accommodate differences in other equipment provided on tracker 110.

Electronics control box 124 differs from control box 24 in that instead of including an RFID reader 48, control box 124 houses an RFID transceiver 148, shown in phantom in these figures. Alternatively, control box 124 may include an RFID reader 48 and a separate RFID writer. The component shown in phantom in FIGS. 8 and 9 should be understood to encompass either configuration but will be referred to hereinafter as "RFID reader writer 148". RFID reader 48 (FIG. 5) is only capable of sending out a query signal, receiving a response from any RFID tag that is located within the RFID antenna's range, and receiving information transmitted by the RFID tag in response to the query signal. The RFID reader writer 148 provided in tracker 110, on the other hand, is not only able to function like RFID reader 48 but is also able to transmit data to any RFID tag within the RFID antenna's range. RFID reader writer 148 is therefore additionally able to be used encode an RFID tag with information.

Because of the presence of RFID reader writer, tracker 110 is configured in such a manner as to be able to be moved to a location within a facility and be used as a mobile "birthing station" that encodes RFID tags. Tracker 110 can be moved to second location within the facility to monitor products or items as they travel through a process, such as a manufacturing process. Tracker 110 can further be moved to a third location within the facility to monitor and verify finally completed products before they are shipped. In other instances, tracker 110 can be utilized to check RFID tagged products when they are delivered to a facility. Some of these applications will be described later herein in detail.

A second way that tracker 110 differs from tracker 10 is that instead of a single RFID antenna 26 being provided on vertical strut 132, as in tracker 10, tracker 110 has a generally U-shaped mounting assembly 190 that includes a horizontal arm 190a, and two vertical arms 190b, 190c. Horizontal arm 190a is adjustably engaged with vertical strut 132 in any suitable manner such as by bolting the arm 190a to strut 132. The vertical arms 190b, 190c of mounting assembly 190a are of a similar configuration to vertical strut 132. Two mounting assemblies 138A, 138B that are substantially identical in configuration and function to mounting assembly 138 are provided to engage two RFID antennas 126A, 126B to mounting assembly 190 and thereby to vertical strut 132. In particular, the first mounting assembly 138A secures the first RFID antenna 126A to first arm 190b and the second mounting assembly 138B secures the second RFID antenna 126B to second arm 190B. First and second RFID antennas 126A, 126B are thereby arranged a distance laterally apart from one another and are operable independently of one another.

Tracker 110 also differs from tracker 10 in that a first barcode scanner 192A and a second barcode scanner 192B are operatively engaged with mounting assembly 190. As illustrated, mounting assemblies 194A, 194B are utilized to engage the two barcode scanners 192A, 192B to first arm 190a and second arm 190b, respectively. The mounting assembly 194A, 194B are illustrated as being substantially identical to the mounting assemblies 138A, 138B and thus enable a wide range of possible adjustment for the two barcode scanners 192A, 192B. The barcode scanners 192A, 192B are spaced a distance laterally apart from one another and are independently operable.

Each of the RFID antennas 126A, 126B and barcode scanners 192A, 192B will be operatively engaged with the equipment within the control box 124. The power source 146 will power the antennas 126A, 126B, and barcode scanners 192A, 192B. The PCB controller 152 will control the operation of the RFID antennas 126A, 126B and barcode scanners 192A, 192B. The cellular modem 152, like the cellular modem 52 will enable two-way communication with tracker 110 and a remote devices such as a remote central processing unit.

Tracker 110 further differs from tracker 10 in that instead of the indicator assembly being a light stack 28, tracker 110 includes a display screen 196. The display screen 196 may include a user interface (such as a touchscreen) which allows an operator to enter data into the system. The display screen 196 will also display information thereon for an operator to view.

Tracker 110 may be used as a birthing station in the following manner. With reference to FIG. 8, a plurality of shipping containers 200, 204 may be moved by a conveyor 212 in a direction indicated by arrow "J" past the tracker 110. Each shipping container, such as container 200, is provided with an RFID tag 208 that is embedded in the container 200 itself or are provided on or in an article retained within the interior of the container 200. A barcode 210 is applied to an exterior surface of the container 200 and is therefore visible to a human observer. Barcode 210 is also able to be read by barcode scanners 192A, 192B. It is important to note that when container 200 moves into the range of RFID antenna 126A the RFID tag 208 may not have any information written thereon or may only have limited information written thereon.

When a first barcode 210 comes into the range of the barcode scanner (reader) 192A, the scanner 192A will read the Universal Product Code (UPC) thereon as indicated by (see "K") and will electronically transmit that information to PCB controller 152. The PCB controller 152 in turn will signal the RFID reader writer 148 to encode the transmitted information (i.e., UPC) to the RFID tag 208 within container 200 and will write that information on the RFID tag 208. The PCB controller 152 may instruct the RFID reader writer 148 to write additional pertinent information on the RFID tag 208. For example, the name of the part or product supplier and/or a date of fabrication of the part or product may be written on the RFID tag 208. Some or all of the information being scanned by barcode reader 192A and/or written by RFID reader writer 148 is displayed on the display screen 196 for review by an operator if desired.

Container 210 will then continue to be conveyed by conveyor 212 in the direction "J". When barcode 210 comes into the range of the second barcode scanner 192B, that scanner will read the barcode 210 and the barcode will be displayed on the display screen 196 and will be transmitted to the PCB controller 152. The software in the PCB controller 152 will compare the two transmitted barcodes (one from the first barcode scanner 192A and the other from the second barcode scanner 192B) to see if they are identical. If the barcodes are not identical, then an alarm will be triggered by PCB controller 152. The alarm may be a light that is switched on, a message that is displayed on the display screen, and or a sound generated by a noise generator (not shown) provided on tracker 110. (The light or noise generator may comprise part of the display screen or may be separately engaged on tracker 110. For example, the noise generator may be located within the interior of control box 124. When the alert is received by the operator, he or she will take corrective action and either halt the conveyor or remove the container 200 that generated the alert.

If, on the other hand, the two barcodes match, then software of the PCB controller 152 will instruct the RFID reader writer 148 to actuate the second RFID antenna in order to read the RFID tag 208 once again. The RFID reader writer 148 will retrieve data from the second reading of the RFID tag 208 and transmit the same to the PCB controller 152. The PCB controller 152 will compare the information retrieved from the second read of the RFID tag 208 and compare the same to the original information that was written to the RFID tag 208. If there is a discrepancy in the information retrieved from the RFID tag reading then the PCB controller 152 will send an alert to the operator to take remedial action. If the original information and the read information correlates, the now barcoded and RFID tagged container 200 is allowed to continue traveling along conveyor 212.

Figure 10:
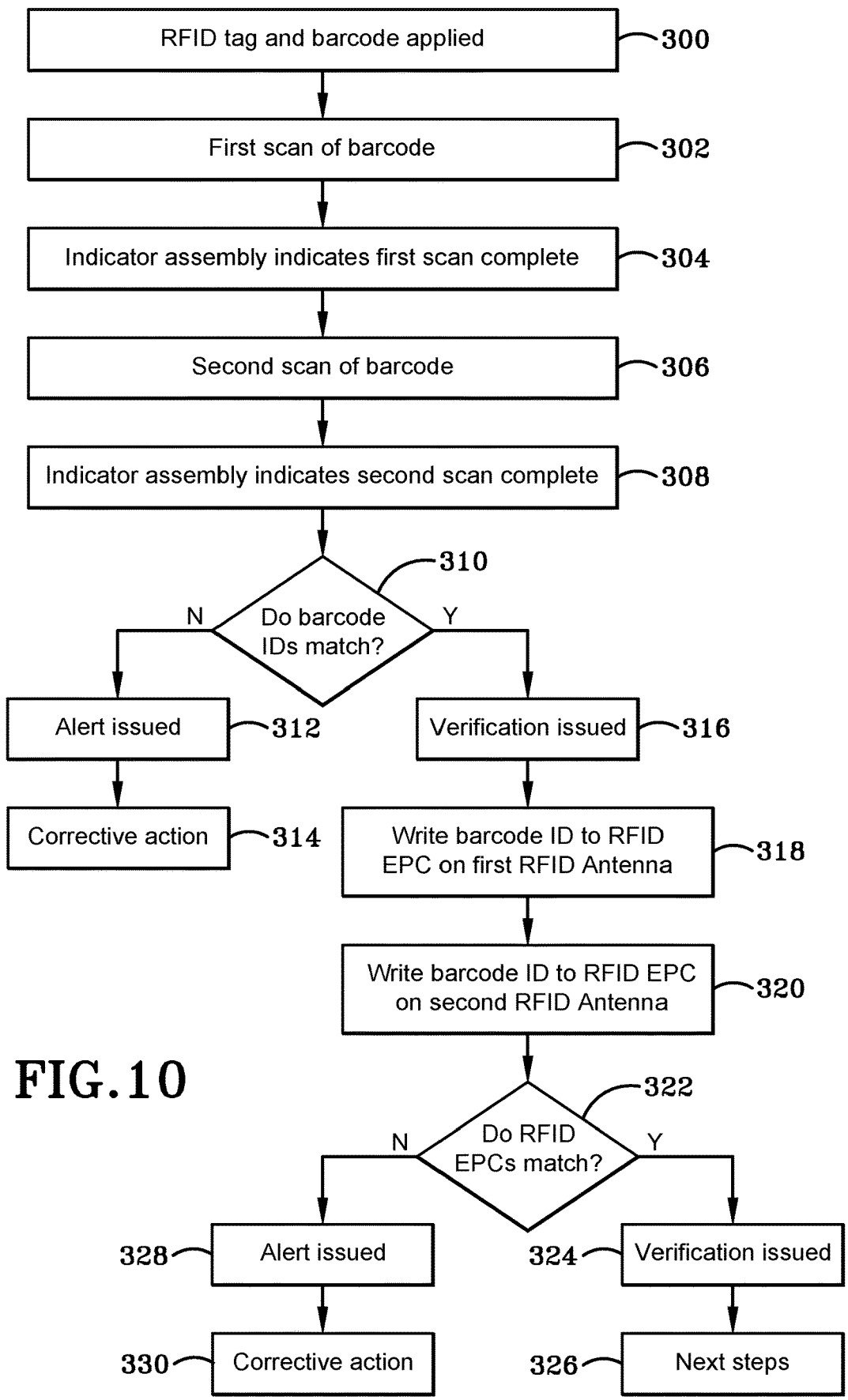
FIG. 10 is a flow chart illustrating a method of RFID tagging and barcoding a product or container at a birthing station utilizing the mobile RFID asset tracker illustrated in FIG. 9.

FIG. 10 shows a flowchart of an exemplary method of installing a barcode and correlated RFID tag that is undertaken utilizing mobile RFID asset tracker 110 at a birthing station. Firstly, a power cable is plugged into the power center of tracker 110 (located on the bottom panel of the housing of control box 124) and the On/Off switch is moved to the "ON" position for tracker 110 to boot up.

As a first step in the method indicated at 300, an RFID tag is provided on the product, part, item, or container 200 (all referred to hereafter as "container 200") to be presented before the tracker 110 as illustrated in FIG. 8. The RFID tag 208 is not visible on the exterior of the container 200. (In some applications RFID tag may be provided on the exterior surface of container 200.) As part of the first step 300, a barcode 210 is applied to the exterior surface of container 200 and is therefore visible to an observer of container 200.

Prior to presenting container 200 before tracker 110, appropriate adjustments are made to tracker 110 to present the first and second barcode scanners 192A, 192B and the first and second RFID antennas 126A, 126B at an appropriate height relative to base 130 that will enable the RFID tag 208 and barcodes 210 to be easily scanned and read. The orientation of each RFID antenna 126A, 126B and each barcode scanner 192A, 192B relative to vertical strut 132 will be changed to a desired angle that enables container 200 to be easily scanned and read.

When all of the aforementioned equipment on the mounting assembly 190 is positioned correctly, container 200 is moved into the birthing station as shown in FIG. 10. Tracker 110, in a second step 302, first barcode reader 192A scans barcode 210 a first time. When the scanning is complete, the indicator assembly 196 provides a visual indicator and/or an audible indicator is provided by tracker 110 at step 304. The indicator (visual and/or audible) lets the operator know that the first scan of barcode 210 is complete. In step 304, for example, an image/text may be displayed on display screen 196, a yellow light may be illuminated, and/or tracker 110 may make an audible sound (such as a single "beep"). The barcode ID is transmitted by first barcode reader 192A to control module 152.

Second barcode reader 192B then scans barcode 210 for a second time in step 306. When the second scan 306 is complete, tracker 110 again provides an indication, 308, that the second barcode scan is completed. For example, a yellow light is illuminated once again and the tracker 110 makes another "beep". The barcode ID is transmitted by second barcode reader 192B to control module 152.

The programming of control module 152 on tracker 110 then compares the first read of the barcode ID with the second read of the barcode ID at step 310. If the two scanned barcodes IDs do not match one another then the tracker 110 issues an alarm as at step 312. For example, the tracker 310 displays a red light, or sends an alert text to display screen 196, and/or generates an audible sound. At this point, the operator knows that the container 200 before them has an issue with the barcode 210 that has been applied thereto. Corrective action is then be taken as at step 314 (FIG. 10).

Corrective action 314 may take a number of forms. For example, the operator check that tracker 110 is receiving adequate power by ensuring that a power cable is connected to the appropriate connection of the power center (see 54 in FIG. 4) on the bottom panel of the control box housing. The operator will also check that the power toggle button on the power center is moved to the "ON" position. The operator may additionally check the alignment of the container 200 on conveyor 212 and relative to the birthing station, i.e., to tracker 110. The operator may further visually check the barcode ID and compare it with a display of the ID on the display screen 196. The operator may also check the alignment of the first and second barcode scanners 192A, 192B. This can be accomplished by pressing a dedicated button (not shown) on tracker 110. A green bar will display on the display screen 196 to let the operator know that he or she should adjust the position and orientation of one or both of the first and second barcode scanners 192A, 192B until a green light of the associated scanner is positioned over the 2D QR code on the barcode 210. It is also possible to move or otherwise adjust the mounting assembly 138A. The barcode scanner cable connection can also be checked and it should be determined if the first and second barcode scanners 192A, 192B have power. If none of the above work, then a new barcode should be adhered to container 200 and the container 200 should be moved to scan the barcode again as in step 302. The procedure should be run through again until the first and second barcode ID reads are found to match one another.

If the barcode IDs from the first read and the second read match at step 310, then a verification may be issued by tracker 110, as a step 316. The verification may be visual, such as a text or image on display screen 196, and/or audible by the generation of a sound. In some instances, the verification 316 may be omitted and tracker 110 will move straight to actuating the RFID antenna 126A and using the RFID reader writer 148 to write the barcode ID as an Electronic Product Code (EPC) to first RFID antenna 126A. This is indicated as step 318 in FIG. 10. Tracker 110 also writes the EPC code to second RFID antenna 126B, indicated at step 320. (It will be understood that after each of the steps 318 and 320, the indicator assembly may provide an indication (visual and/or audible) that the step was successfully completed.

The programming of control module 152 then reads and compares the first and second EPCs at step 322. If there is a match, then the EPC is written to RFID tag 208. The tracker 110 also activates the indicator assembly 196 to display a verification that a match has occurred, as at 324. For example, the display screen 196 may display a green light and/or the tracker 110 may make an audible "beep". The container 200 is then moved to a next stage in the production process or may be shipped or made ready for shipping. The next stage is indicated in the flow chart by the number 326 in FIG. 10.

If the in step 322 the two EPCs do not match, then an alert will be displayed by the indicator assembly, as at 328. For example display screen 196 may display a red light or an audible alarm may be generated by the system. The operator is able to then take corrective action as indicated at 330. Corrective action may include checking the alignment of the container 200 on conveyor 212 to ensure it is at the correct location for scanning and that the RFID antenna 126A, 126B have power. Secondly, the operator can verify if there is actually an RFID tag 208 embedded within the container 200 by using a handheld RFID scanner. If the operator verifies there is an RFID tag in the container 200 with the handheld scanner, then the power may be reset to the entire tracker 110 to reboot the system. If the automated process is not functioning then a manual process for scanning and/or encoding the RFID tag may be utilized.

As described above, the tracker 110 illustrated in FIGS. 8 and 9 may be used as a birthing station as illustrated in FIG. 10. The birthing station may be located in-line (i.e., in the production line for the part or product in a facility). The birthing station may alternatively be located off-line, i.e., spaced a distance away from the production line for the part or product. The end-user has the flexibility to move the tracker 110 from place to place within the facility as needed by simply rolling the frame across the factory floor from one location to another as required. The end-user is therefore able to decide if the birthing station should be used in an in-line method or an off-line method and can readily move the tracker 110 to the desired location.

Tracker 110 may also be moved to any position along a production line to verify that the UPC of the barcode 210 and/or the information on the RFID tag 208 has not become compromised in any way. The tracker 110 will be rolled across the surface on the casters to the desired location adjacent the production line and will be booted up to scan the RFID tag 208 and barcode 210. This check of the tag and barcode may be accomplished by only activating one of the barcode scanners 192A or 192B and one of the RFID antenna 126A, 126B.

If additional information is required to be written on the RFID tag 208 at this intermediate point in the fabrication of the part or product, the PCB controller 152 will activate the RFID reader writer 148 and instruct it to write the appropriate information to the RFID tag 208 as previously described. Only one RFID antenna 126A, 126B may then be actuated by the PCB controller 152 to verify that the information written to the RFID tag 208 is complete and accurate.

Tracker 110 may additionally be moved from the intermediate point in the fabrication of the product referred to above to an end point of the production line. At this end point, the container 200 may possibly be located on a pallet full of similarly barcoded and RFID tagged containers. Tracker 110 may be utilized at this packaging stage to again verify that barcode 210 remains barcode scanner readable. Additionally, any additional information required to be written to RFID tag 208 may be written therein by RFID reader writer 148 and verified by conducting a read of the information encoded on RFID tag 208. For example, the date of shipment of the container 200 may be written onto the RFID tag 208. The pallet of containers, including container 200, may then be shipped from the facility to another second facility or to a customer.

While a first embodiment tracker 10 and a second embodiment track 110 have been described herein and illustrated in the attached figures, it should be understood that a mobile RFID asset tracker in accordance with the present disclosure can be customized to fit a particular use. For example, the light stack 28 illustrated in FIG. 2 may be replaced with a differently configured illumination device. The differently configured device may be of a different shape from the illustrated light stack 28 and, instead of including multiple differently colored lights, may comprise only a single light of one color. Still further, other mounting assemblies may be engaged with vertical strut 32 or 132 to house other peripheral devices such as optical scanners and/or cameras, for example. The tracker may be provided with one RFID antenna and two barcode scanners, or one RFID antenna and one barcode scanner, or one RFID antenna and two barcode scanners. Instead of only having a light stack or a display screen the tracker may be provided with a light stack (or single light) and a display screen. Any configuration of this type of equipment can be arranged on the tracker to suit a particular user's needs.

While vertical strut has been described herein as being U-shaped in cross-section, it will be understood that in other embodiments the vertical strut 32 may be square in cross-section, L-shaped in cross-section, circular in cross-section or of any other desired configuration.

Furthermore, while adjustability for mounting of different components/equipment is provided in vertical strut by providing apertures 32f and the channel 32d, in other embodiments, vertical strut 32 may be differently configured. For example, the vertical strut may provide for fixed mounting positions of various components but the strut itself may telescope or otherwise be adjustable in height so as to provide the user with the opportunity to locate components at a desired height relative to base 30.

It should further be understood that the mounting assemblies 38, 138A, 138B, 190 are exemplary only, and any other configuration or supporting equipment on vertical strut may be utilized on a mobile RFID asset tracker in accordance with the present disclosure. Furthermore, the frame 22, 122 may be differently configured from what is illustrated in the attached figures. For example, more than one vertical strut may extend upwardly from the base and different equipment may be mounted on different vertical struts. Additionally, the base 30, 130 may be differently configured. For example, the base may be H-shaped instead of T-shaped.

While tracker 10, 110 have been described herein as including lockable casters on the frame 22, 122, it should be understood that wheels or any other suitable mechanism for moving the frame across a surface may be used instead.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled with the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A self-contained mobile Radio Frequency Identification (RFID) asset tracker comprising:
a frame configured for movement across a surface;
an electronics control box mounted on the frame;
an RFID reader housed within the electronics control box, said RFID reader being adapted to interrogate an RFID tag on an item;
an RFID antenna mounted on the frame outside of the electronics control box, said RFID antenna being coupled with the RFID reader; and
a power source housed within the electronics control box, said power source being operatively engaged with the RFID reader and the RFID antenna; and
wherein said RFID reader is configured to interrogate RFID tagged items that come into a field of view of the RFID antenna.

2. The self-contained mobile RFID asset tracker according to claim 1, further comprising a mounting assembly which operatively engages the RFID antenna to the frame a distance from the electronics control box; wherein the mounting assembly is configured to permit the RFID antenna to be oriented at a range of different angles relative to the frame.

3. The self-contained mobile RFID asset tracker according to claim 1, wherein a position of the electronics control box and the RFID antenna on the vertical strut is selectively adjustable.

4. A self-contained mobile Radio Frequency Identification (RFID) asset tracker comprising:
a frame configured for movement across a surface;
an electronics control box mounted on the frame;
an RFID reader housed within the electronics control box, said RFID reader being adapted to interrogate an RFID tag on an item;
an RFID antenna mounted on the frame outside of the electronics control box, said RFID antenna being coupled with the RFID reader; wherein said RFID reader is configured to interrogate RFID tagged items that come into a field of view of the RFID antenna; and
a communications device housed within the electronics control box, said communications device being coupled with the RFID reader and being adapted to communicate with a remote central processing unit.

5. The self-contained mobile RFID asset tracker according to claim 4, further comprising a power source operatively engaged with the RFID reader, the RFID antenna, and the communications device, wherein the power source is housed within the electronics control box.

6. A self-contained mobile Radio Frequency Identification (RFID) asset tracker comprising:
a frame configured for movement across a surface;
an electronics control box mounted on the frame;
an RFID reader housed within the electronics control box, said RFID reader being adapted to interrogate an RFID tag on an item;
an RFID antenna mounted on the frame outside of the electronics control box, said RFID antenna being coupled with the RFID reader; wherein said RFID reader is configured to interrogate RFID tagged items that come into a field of view of the RFID antenna; and
a Printed Circuit Board (PCB) control module housed within the electronics control box and operatively engaged with the RFID reader and with the RFID antenna, wherein programming is provided in the PCB control module and is configured to control operation of the RFID reader and the RFID antenna.

7. The self-contained mobile RFID asset tracker according to claim 6, wherein the PCB control module includes a memory for data storage, and wherein interrogated data retrieved by the RFID reader is at least temporarily stored in the memory.

8. The self-contained mobile RFID asset tracker according to claim 6, further comprising a power source housed within the electronics control box, wherein the power source is operatively engaged with the RFID reader, the RFID antenna, and the PCB control module.

9. The self-contained mobile RFID asset tracker according to claim 6, further comprising an indicator assembly coupled with the RFID reader and the PCB control module, said indicator assembly being configured to provide one or both of a visual indicator and an audible indicator to an operator when the RFID reader interrogates an RFID-tagged item.

10. The self-contained mobile RFID asset tracker according to claim 9, wherein the indicator assembly is engaged with the frame outside of the electronics control box and comprises a light stack having one or more lights provided therein.

11. The self-contained mobile RFID asset tracker according to claim 9, wherein the indicator assembly is engaged with the frame outside of the electronics control box and comprises a display screen.

12. The self-contained mobile RFID asset tracker according to claim 6, further comprising a barcode scanner operatively engaged with the frame and located outside of the electronics control box, wherein the barcode scanner is coupled with the PCB control module.

13. A self-contained mobile Radio Frequency Identification (RFID) asset tracker comprising:
  a frame configured for movement across a surface;
  an electronics control box mounted on the frame;
  an RFID reader housed within the electronics control box, said RFID reader being adapted to interrogate an RFID tag on an item;
  an RFID antenna mounted on the frame outside of the electronics control box, said RFID antenna being coupled with the RFID reader, wherein said RFID reader is configured to interrogate RFID tagged items that come into a field of view of the RFID antenna; and
  an RFID writer that is provided as an integral part of the RFID reader or is separate from the RFID reader and is housed within the electronics control box.

14. The self-contained mobile RFID asset tracker according to claim 13, further comprising a power source operatively engaged with the RFID reader, the RFID antenna, the RFID writer, and the communications device, wherein the power source is housed within the electronics control box.

15. A self-contained mobile Radio Frequency Identification (RFID) asset tracker comprising:
  a frame configured for movement across a surface;
  an electronics control box mounted on the frame;
  an RFID reader housed within the electronics control box, said RFID reader being adapted to interrogate an RFID tag on an item;
  an RFID antenna mounted on the frame outside of the electronics control box, said RFID antenna being coupled with the RFID reader, wherein said RFID reader is configured to interrogate RFID tagged items that come into a field of view of the RFID antenna; and
  a plurality of casters or wheels provided on the frame, said plurality of casters or wheels enabling rolling movement of the frame across the surface.

16. The self-contained mobile RFID asset tracker according to claim 15, wherein the tracker is sufficiently light in weight as to be rolled across a floor surface by a single human operator pushing or pulling the frame.

17. A method of reading a Radio Frequency Identification (RFID) tag on an article comprising:
  moving a mobile RFID asset tracker into a vicinity of the article that includes the RFID tag;
  sending a query signal from an RFID reader housed within an electronics control box of the mobile RFID asset tracker to an RFID antenna mounted on a frame of the mobile RFID asset tracker a distance from the electronics control box;
  sending the query signal from the RFID antenna to the RFID tag on the article;
  reading data encoded on the RFID tag with the RFID reader;
  coupling the RFID reader and the RFID antenna with a Printed Circuit Board (PCB) control module housed within the electronics control box; and
  saving the read data into a memory of the PCB control module.

18. The method according to claim 17, further comprising:
  coupling the RFID reader and the RFID antenna with a PCB control module housed within the electronics control box;
  coupling the PBC control box with a communications device housed within the electronics control box; and
  transmitting the read data to a remote electronics device with the communications device.

19. The method according to claim 17, further comprising:
  adjustably mounting one or both of the electronics control box and the RFID antenna on the frame of the mobile RFID asset tracker.

20. A method of reading a Radio Frequency Identification (RFID) tag on an article comprising:
  moving a mobile RFID asset tracker into a vicinity of the article that includes the RFID tag;
  sending a query signal from an RFID reader housed within an electronics control box of the mobile RFID asset tracker to an RFID antenna mounted on a frame of the mobile RFID asset tracker a distance from the electronics control box;
  sending the query signal from the RFID antenna to the RFID tag on the article;
  reading data encoded on the RFID tag with the RFID reader; and
  generating an indicator with an indicator assembly provided on the tracker when the RFID reader reads the RFID tag on the article.

21. The method according to claim 20, wherein the generating of the indicator includes one or more of illuminating a light on light stack mounted on the frame outside of the electronics control box, displaying text or an image on a display screen mounted on the frame outside of the electronics control box, and generating a sound with a sound generator located inside or outside of the electronics control box.

22. The method according to claim 20, further comprising:

powering the RFID antenna, the RFID reader, the PCB control module, and the indicator assembly with a power source housed within the electronics control box.

23. A method of reading a Radio Frequency Identification (RFID) tag on an article comprising:
- moving a mobile RFID asset tracker into a vicinity of the article that includes the RFID tag, wherein moving of the mobile RFID asset tracker includes rolling the mobile RFID asset tracker across a floor of a facility on casters or wheels by a single human operator pushing or pulling the mobile RFID asset tracker by hand;
- sending a query signal from an RFID reader housed within an electronics control box of the mobile RFID asset tracker to an RFID antenna mounted on a frame of the mobile RFID asset tracker a distance from the electronics control box;
- sending the query signal from the RFID antenna to the RFID tag on the article;
- reading data encoded on the RFID tag with the RFID reader.

24. The method according to claim 23, wherein the tracker is sufficiently light enough in weight as to be rolled across a floor surface by a single human operator pushing or pulling the frame.

25. A method of reading a Radio Frequency Identification (RFID) tag on an article comprising:
- moving a mobile RFID asset tracker into a vicinity of the article that includes the RFID tag;
- sending a query signal from an RFID reader housed within an electronics control box of the mobile RFID asset tracker to an RFID antenna mounted on a frame of the mobile RFID asset tracker a distance from the electronics control box;
- sending the query signal from the RFID antenna to the RFID tag on the article;
- reading data encoded on the RFID tag with the RFID reader; and
- wherein the RFID reader includes or is coupled with an RFID writer and the method further comprises writing data to the RFID tag.

26. The method according to claim 25, further comprising operatively engaging a power source housed within the electronics control box with the RFID reader, the RFID antenna, the RFID writer, and the communications device.

* * * * *